(12) United States Patent
Nicolson et al.

(10) Patent No.: US 8,732,444 B2
(45) Date of Patent: May 20, 2014

(54) INFORMATION PROCESSING DEVICE AND INFORMATION PROCESSING METHOD

(75) Inventors: Kenneth Alexander Nicolson, Hyogo (JP); Hideki Matsushima, Osaka (JP); Hisashi Takayama, Osaka (JP); Takayuki Ito, Osaka (JP); Tomoyuki Haga, Nara (JP)

(73) Assignee: Panasonic Corporation, Osaka (JP)

( * ) Notice: Subject to any disclaimer, the term of this patent is extended or adjusted under 35 U.S.C. 154(b) by 435 days.

(21) Appl. No.: 13/144,966

(22) PCT Filed: Feb. 18, 2010

(86) PCT No.: PCT/JP2010/001020
§ 371 (c)(1),
(2), (4) Date: Jul. 18, 2011

(87) PCT Pub. No.: WO2010/095432
PCT Pub. Date: Aug. 26, 2010

(65) Prior Publication Data
US 2011/0276795 A1    Nov. 10, 2011

(30) Foreign Application Priority Data
Feb. 18, 2009    (JP) ................. 2009-035530

(51) Int. Cl.
*G06F 9/00*    (2006.01)
(52) U.S. Cl.
USPC ............. 713/1; 713/2; 713/189; 713/193
(58) Field of Classification Search
None
See application file for complete search history.

(56) References Cited

U.S. PATENT DOCUMENTS

| | | | |
|---|---|---|---|
| 7,103,771 | B2 | 9/2006 | Grawrock |
| 7,752,465 | B2 | 7/2010 | Ebringer et al. |
| 7,930,563 | B2 | 4/2011 | Ebringer et al. |
| 8,566,606 | B2 | 10/2013 | Movva et al. |
| 2003/0115453 | A1 | 6/2003 | Grawrock |
| 2003/0226031 | A1* | 12/2003 | Proudler et al. ............... 713/200 |
| 2005/0229011 | A1 | 10/2005 | Ebringer et al. |
| 2006/0212939 | A1 | 9/2006 | England et al. |
| 2008/0104382 | A1 | 5/2008 | Tarkkala |
| 2008/0242988 | A1 | 10/2008 | Yoshida et al. |
| 2008/0282348 | A1 | 11/2008 | Proudler et al. |
| 2009/0070573 | A1 | 3/2009 | Ebringer et al. |
| 2009/0307487 | A1 | 12/2009 | Movva et al. |
| 2011/0173643 | A1 | 7/2011 | Nicolson et al. |

FOREIGN PATENT DOCUMENTS

| | | |
|---|---|---|
| CN | 101147154 | 3/2008 |
| EP | 1 679 632 | 7/2006 |
| JP | 2005-301550 | 10/2005 |
| JP | 2008-264530 | 11/2008 |

(Continued)

OTHER PUBLICATIONS

International Search Report issued Jun. 7, 2010 in International (PCT) Application No. PCT/JP2010/001020.

(Continued)

*Primary Examiner* — Paul Yanchus, III
(74) *Attorney, Agent, or Firm* — Wenderoth, Lind & Ponack, LLP.

(57) ABSTRACT

A method to allow a value to be written into one PCR domain, only if values from a second PCR domain are valid, thus ensuring the extension of the chain of trust between domains.

10 Claims, 15 Drawing Sheets

(56) References Cited

FOREIGN PATENT DOCUMENTS

| JP | 2012-505437 | 3/2012 |
|---|---|---|
| WO | 03/052565 | 6/2003 |
| WO | 2007/124091 | 11/2007 |
| WO | 2010/041467 | 4/2010 |

OTHER PUBLICATIONS

Written Opinion of the International Searching Authority issued Jun. 7, 2010 in International (PCT) Application No. PCT/JP2010/001020.
Reply to Written Opinion issued Jun. 7, 2010 in International (PCT) Application No. PCT/JP2010/001020.
International Preliminary Report on Patentability issued May 24, 2011 in PCT/JP2010/001020.
K. Dietrich et al., "Secure Boot Revisited", The $9^{th}$ Internationation Conference for Young Computer Scientists, 2008, ICYCS 2008, IEEE, Piscataway, NJ, USA, Nov. 18, 2008, pp. 2360-2365, XPO31373538 ISBN: 978-0-7695-3398-8.
The Trust Computing Group's (TCG) Mobile Trusted Module (MTM) documents TCG Mobile Reference Architecture version 1.0, Jun. 12, 2007.
TCG Mobile Trusted Module Specification, version 1.0, Jun. 12, 2007.
A Chinese Office Action, issued Aug. 20, 2013 in counterpart application 201080004866.X (with partial English translation).

\* cited by examiner

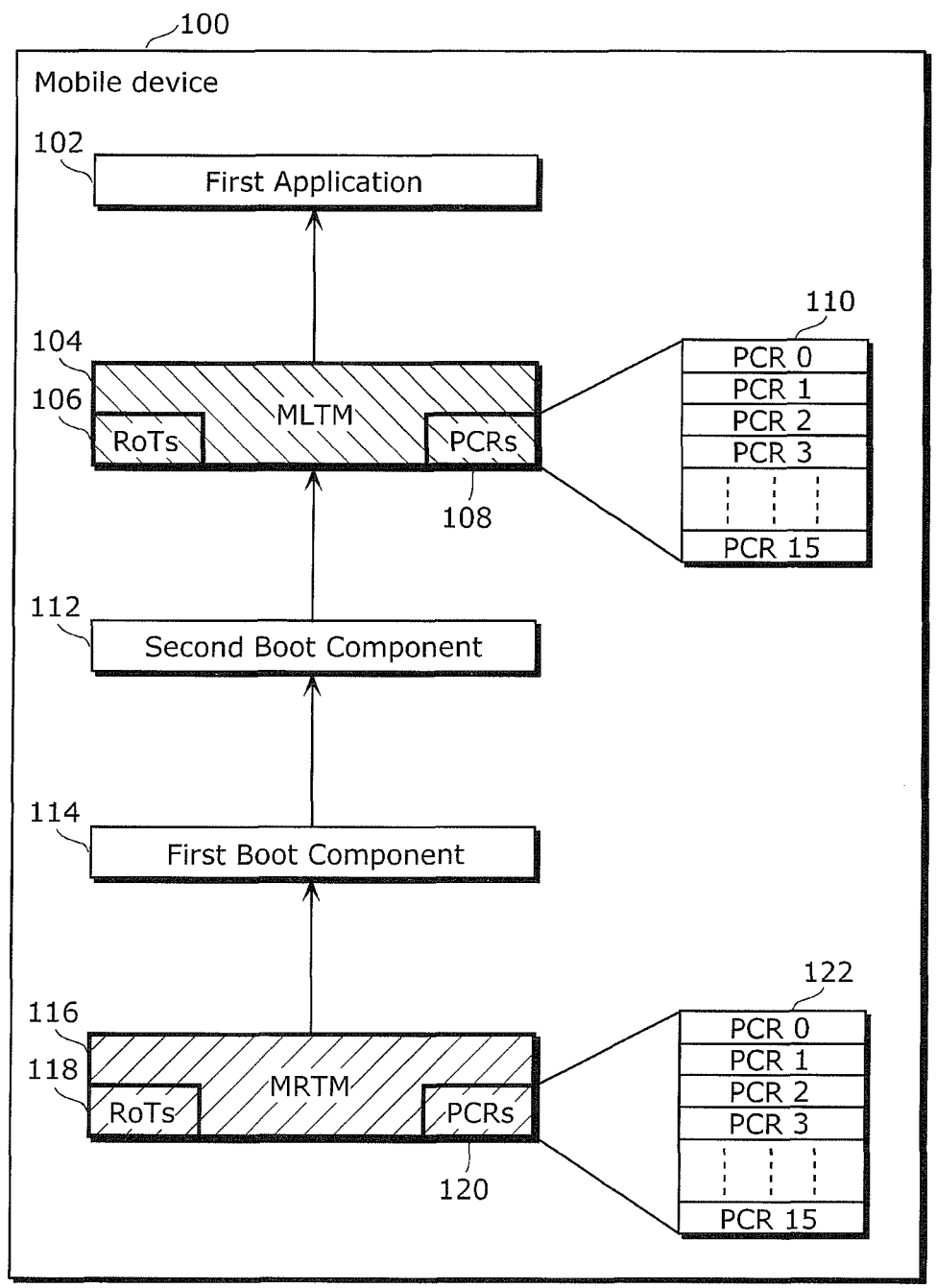

INFORMATION PROCESSING DEVICE AND INFORMATION PROCESSING METHOD

TECHNICAL FIELD

The present invention relates to information processing devices that execute plural programs, and relates in particular to an information processing device that launches, in a trusted fashion, plural programs to be executed in sequences different from the others.

BACKGROUND ART

Initiatives such as the Trusted Computing Group's (TCG) Mobile Trusted Module (MTM) documents TCG Mobile Reference Architecture version 1.0 12 Jun. 2007 (Non Patent Literature 1) and TCG Mobile Trusted Module Specification version 1.0 12 Jun. 2007 (Non Patent Literature 2) describe how to start-up a device in an assured and trusted fashion. These methods have been thoroughly reviewed to ensure that trust and security is maintained throughout the boot process, so provide a useful baseline for those wanting to implement a device that can boot securely. A key component of this secure boot process is a RIM (Reference Integrity Metrics) Certificate. This is a signed structure that defines what the current expected platform state should be, represented by a hash of a set of Platform Configuration Registers (PCRs), which themselves contain known, publically defined hash values. These PCRs act as integrity measurements that may be recorded in RIM Certificates to define an expected machine state. In addition, the RIM Certificate also specifies a PCR to be extended if the current state is verified. This extend process takes a specified PCR and calculates a new hash value based on the previous PCR value concatenated with a new known value defined within the RIM Certificate. A typical straightforward secure boot sequence as defined by the TCG starts with the initialization and self-verification of the core components such as the roots of trust for verification and for measurement (the RTV+RTM), the MTM itself and associated core MTM interface components. Next, additional components that support other parts of the firmware are started in a trusted fashion such that each component is verified by an already-trusted component before passing control to it, then the component verifies itself to ensure it has been launched from a trusted component. This sequence of verify=>execute=>self-verify has the effect of dynamically extending the trust boundary outwards from the roots of trust to each component within the system. Finally the operating system runs to provide a secure and trusted path for client applications to access MTM services.

There are extra functions that may appear within the above sequence of events. The TCG specifies that a device may have more than one MTM, some of which must be started during secure boot, others which may load within application space. Alternatively, as described within Japanese patent application 2008-264530 transient PCRs may be defined, or as described within US Patent Application No 2006/0212939 A1 (Patent Literature 1) virtual PCRs may be defined. These functions and modules that manage a set of PCRs (and provide other services as defined in the prior art) are described collectively within this patent application as "PCR domains", with a oneto-one relationship of one PCR domain managing one set of PCRs. In addition, a "PCR domain state" is defined as being a set of values of one or more PCRs from a PCR domain at a given point in time. By indicating the values of specific PCRs, the domain state describes what components are already active within the domain; as described above for each PCR domain there is a specified expected sequence of extend operations, so by looking at a given PCR domain state one can determine the progress through the expected sequence of extend operations, thus by implication the progress through the expected sequence of component execution. In the TCG specification this state may be represented by a TPM_PCR_SELECTION to indicate the PCRs within the domain to reference, and a TPM_COMPOSITE_HASH to store a composite hash of the PCRs indicated by the TPM_PCR_SELECTION. RIM Certificates contain such a PCR domain state to indicate the PCR values that must be set within the domain for the certificate to be considered valid.

CITATION LIST

Patent Literature

PTL 1: US Patent Application No 2006/0212939 A1

Non Patent Literature

NPL 1: the Trusted Computing Group's (TCG) Mobile Trusted Module (MTM) documents TCG Mobile Reference Architecture version 1.0 12 Jun. 2007

NPL 2: TCG Mobile Trusted Module Specification version 1.0 12 Jun. 2007

SUMMARY OF INVENTION

Technical Problem

However, according to the TCG Mobile Reference Architecture, when a first PCR domain is the parent of a second PCR domain, the second PCR domain cannot set a PCR within its own domain based on a measurement it has evaluated itself without breaking the transitive chain of trust, so as described by the prior art each domain must have independent chains of trust, resulting in clients of the second domain being unable to verify trust in the first domain by examining only the PCR values within the second PCR domain.

What is needed, therefore, is a device that will splice together these two chains of trust to form a single chain of trust uniting both the PCR domains allowing clients of the second PCR domain to verify trust in the first domain by examining only the PCR values within the second PCR domain.

When the two chains of trust are being spliced together, it would be useful for action of splicing to be authorised by mutual agreement of the two chains of trust owners, and have either owner allowed to revoke this agreement unilaterally.

So, a method, system and computer program product for implementing a bridge of trust between two PCR domains, while maintaining trust by splicing the chains of trusts for each of the domains are proposed in this application.

Solution to Problem

In order to solve the problem shown above, an information processing device of this invention comprises: a program storing unit configured to store a plurality of programs including first programs and second programs, the first programs being a plurality of programs expected to be booted in a first sequence, and the second programs being a plurality of programs expected to be booted in a second sequence; a first managing unit configured to manage first accumulated information, the first accumulated information indicating one or more programs which have been booted among the first programs; a second managing unit configured to manage second accumulated information, the second accumulated information indicating one or more programs which have been booted among the second programs, the second managing unit being distinct from the first managing unit; a certificate storing unit configured to store first certificate and second certificate, the first certificate including first expected accumulated information and first setting information, the second certificate including second expected accumulated information and second setting information, the first expected accumulated information indicating that all of the first programs have been booted in the first sequence, the second expected accumulated information indicating that none of the second programs have been booted, the first setting information being expected to be identical to the second setting information, the second setting information being a value to be accumulated into the second accumulated information; a controlling unit, when last program in the first sequence has booted and before initial program in the second sequence is booted, configured to: (i) control the first managing unit to verify that all of the first programs have been booted in the first sequence when the first accumulated information matches the first expected accumulated information; (ii) control the second managing unit to verify that none of the second programs have been booted when the second accumulated information matches the second expected accumulated information; (iii) verify that the first setting information matches the second setting information; and (iv) control the second managing unit to accumulate the second setting information into the second accumulated information in order to indicate that all of the first programs have been booted in the first sequence and none of the second programs have been booted, when it is verified that (a) all of the first programs have been booted in the first sequence, (b) none of the second programs have been booted, and (c) the first setting information matches the second setting information.

According to this structure, the information processing device uses two certificates to enforce a link between the first programs and the second programs.

Here, the information processing device accumulates the second setting information into the second accumulated information when the information processing device (i) verifies that all of the first programs have been booted in the first sequence when the first accumulated information matches the first expected accumulated information, (ii) verifies that none of the second programs have been booted when the second accumulated information matches the second expected accumulated information, and (iii) verifies that the first setting information matches the second setting information.

So, the information processing device can bridge trust between two domains (i.e., the first programs and the second programs) by accumulating the second setting information, while maintaining trust by splicing the chains of trusts for each of the domains by verifying booting state of the first programs and second programs is proper.

Advantageous Effects of Invention

According to the present invention, it is possible to boot plural programs in a more trusted fashion.

BRIEF DESCRIPTION OF DRAWINGS

A better understanding of the present invention can be obtained when the following detailed description of a preferred embodiment is considered in conjunction with the following drawings, in which:

FIG. 1A illustrates a block diagram representing the prior art.

DESCRIPTION OF EMBODIMENTS

Figure 1B:
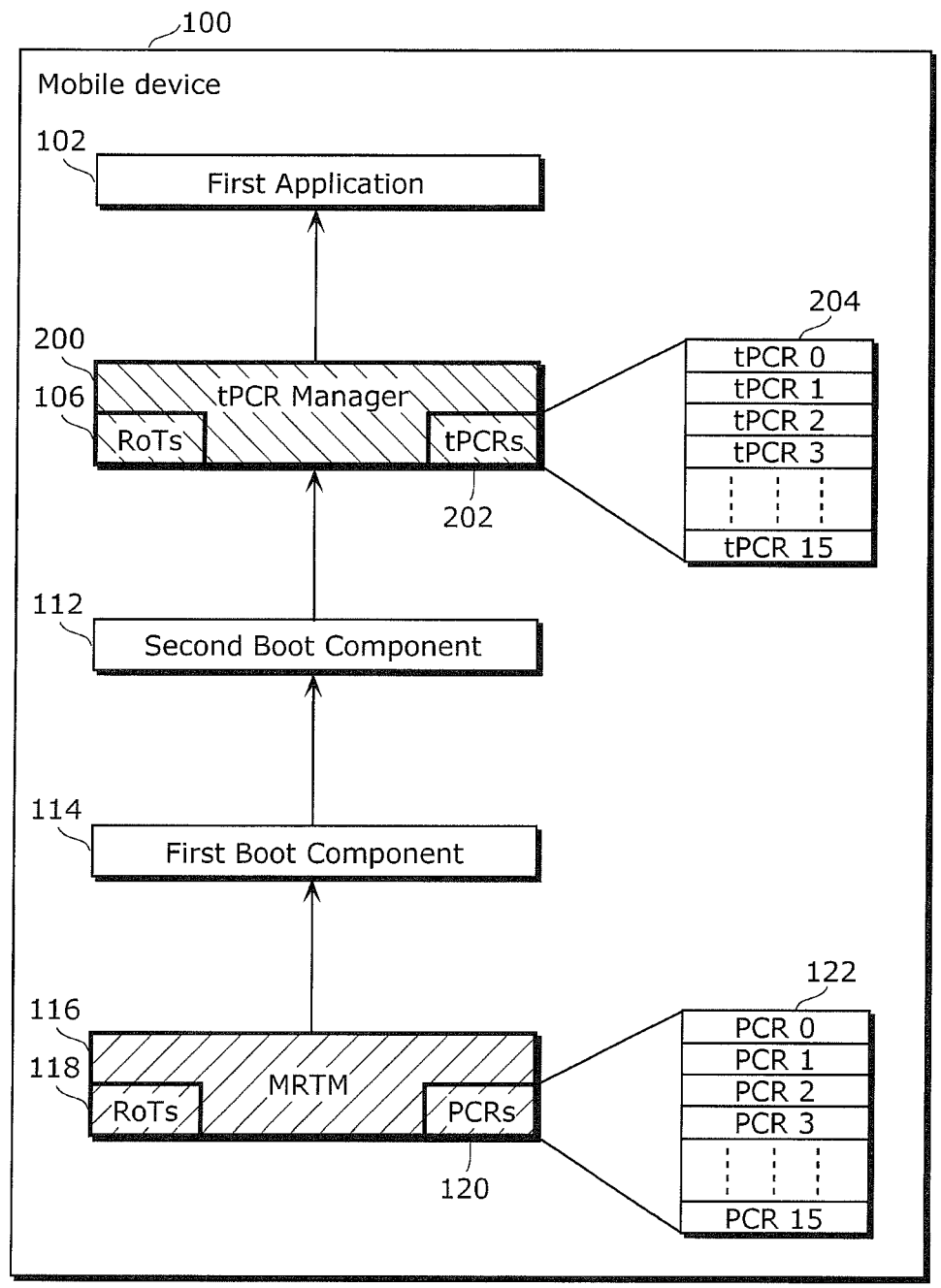
FIG. 1B illustrates a block diagram representing the prior art.

First aspect of the present invention is an information processing device comprising: a program storing unit configured to store a plurality of programs including first programs and second programs, the first programs being a plurality of programs expected to be booted in a first sequence, and the second programs being a plurality of programs expected to be booted in a second sequence; a first managing unit configured to manage first accumulated information, the first accumulated information indicating one or more programs which have been booted among the first programs; a second managing unit configured to manage second accumulated information, the second accumulated information indicating one or more programs which have been booted among the second programs, the second managing unit being distinct from the first managing unit; a certificate storing unit configured to store first certificate and second certificate, the first certificate including first expected accumulated information and first setting information, the second certificate including second expected accumulated information and second setting information, the first expected accumulated information indicating that all of the first programs have been booted in the first sequence, the second expected accumulated information indicating that none of the second programs have been booted, the first setting information being expected to be identical to the second setting information, the second setting information being a value to be accumulated into the second accumulated information; a controlling unit, when last program in the first sequence has booted and before initial program in the second sequence is booted, configured to: (i) control the first managing unit to verify that all of the first programs have been booted in the first sequence when the first accumulated information matches the first expected accumulated information; (ii) control the second managing unit to verify that none of the second programs have been booted when the second accumulated information matches the second expected accumulated information; (iii) verify that the first setting information matches the second setting information; and (iv) control the second managing unit to accumulate the second setting information into the second accumulated information in order to indicate that all of the first programs have been booted in the first sequence and none of the second programs have been booted, when it is verified that (a) all of the first programs have been booted in the first sequence, (b) none of the second programs have been booted, and (c) the first setting information matches the second setting information.

According to this structure, the information processing device uses two bridging certificates to enforce a link between these two PCR domains (corresponding to the first programs and the second programs), where a domain is as defined above, a set of functions and modules than manage PCRs. And, by using information contained within these two certificates the present invention splices together the two chains of trust established by the two PCR domains, thus enhancing the assurance of trust within the present invention.

Furthermore, by this structure, the information processing device allows the owners of each chain of trust to produce a certificate authorising this splicing, with the owners of each chain of trust able to revoke their own certificates independently.

Second aspect of invention is the information processing device wherein, said controlling unit further controls the first managing unit to accumulate the first setting information into the first accumulated information in order to indicate that all of the first programs have been booted in the first sequence and none of the first programs have been booted, when it is verified that (a) all of the first programs have been booted in the first sequence, (b) none of the second programs have been booted, and (c) the first setting information matches the second setting information.

According to this structure, the information processing device reflect the successes of the verifications into the domain of the first programs by accumulating the first setting information into the first accumulated information. Therefore, the information processing device can confirm whether or not the verifications succeed also from the domain of the first programs.

Third aspect of invention is the information processing device wherein, said first managing unit generates the first accumulated information by accumulating a plurality of pieces of first representative information and stores the generated first accumulated information, each of the plurality of pieces of the first representative information representing one of the plurality of the programs that have been booted in the first sequence; said second managing unit generates the second accumulated information by accumulating a plurality of pieces of second representative information and stores the generated second accumulated information in a manner different from said first managing unit, each of the plurality of pieces of the second representative information representing one of the plurality of the programs that have been booted in the second sequence.

According to this structure, the information processing device can manage each of the first accumulated information and the second accumulated information in a different manner from each other. Therefore, the information processing device can manage the first accumulated information and the second accumulated information more flexibly.

Fourth aspect of the present invention is the information processing device wherein, the second certificate includes a register identifier indicating that in which register the second accumulated information to be compared with the second expected accumulated information is to be stored; said second managing unit (i) stores the second accumulated information in a storing area instead of the register, the storing area being identified by virtual identifier, (ii) manages a mapping table showing correspondence between the virtual identifier and the register identifier, (iii) searches, when the second managing unit is controlled to verify that none of the second programs have been booted, the storing area storing the second accumulated information by using the register identifier included in the second certificate and the mapping table.

According to the prior art as described within US Patent Application No 2006/0212939 A1 (Patent Literature 1), the virtual PCRs are named using GUIDs as identifiers. However the RIM Certificate structure defined by the TCG uses incompatible small integer indices. So, the conventional virtual PCRs can not use the RIM Certificate structure defined by the TCG. By this structure, the information processing device searches the storing area storing the second accumulated information by using the register identifier included in the second certificate and the mapping table. So, by this structure, the information processing device can allow these virtual PCRs to be indexed using the small integer format already defined by the TCG. In other words, the information processing device can find the accumulated information, even if the certificate has a conventional format which shows a place storing the accumulated information by using the register identifier (corresponding to the small integer indices).

Fifth aspect of the present invention is the information processing device wherein, each piece of the first representative information is a hash value calculated from each of one or more programs which have been booted in the first sequence, or is a hash value of a character string showing that one of the one or more programs has been booted in the first sequence.

Sixth aspect of the present invention is the information processing device wherein, each piece of the second representative information is a hash value calculated from each of one or more programs which have been booted in the second sequence, or is a hash value of a character string showing that one of the one or more programs has been booted in the second sequence.

Seventh aspect of the present invention is the information processing device wherein, the first managing unit manages the first accumulated information using one of PCRs, transient PCRs, and virtual PCRs; and the second managing unit manages the second accumulated information using one of PCRs, transient PCRs, and virtual PCRs.

According to this structure, the information processing device can use arbitrary combination of PCR schemes as the first accumulated information and the second accumulated information. Therefore, the information processing device can manage the first accumulated information and the second accumulated information more flexibly.

Details of the preferred embodiments of this invention are described below.

FIG. 1A illustrates the prior art according to an embodiment of the TCG Mobile Reference Architecture when the system comprises of an MRTM (Mobile Remote Trusted Module) and an MLTM (Mobile Local Trusted Module). First of all there is the Mobile device 100 that consists of the components described below. Starting from the bottom of the diagram, there is an MRTM 116 that contains within it the RoTs (Roots of Trust) 118 as defined by the TCG Mobile Reference Architecture, and a set of PCRs 120. As illustrated in 122, the PCRs contain a number of individual PCRs; in this figure there are 16 in total, numbered from 0 to 15. Above the MRTM 116 are the First Boot Component 114 and the Second Boot Component 112 that perform various hardware and firmware initialisation functions and provide services to other components. After these components is an MLTM 104, which also contains within it the RoTs (Roots of Trust) 106 as defined by the TCG Mobile Reference Architecture, and a set of PCRs 108. As illustrated in 110, the PCRs contain a number of individual PCRs; in this figure there are 16 in total, numbered from 0 to 15. The two sets of PCRs 108 and 120, and two RoTs 106 and 118 operate independently, although according to the prior art it is possible that the MLTM 104 may delegate some functions to the MRTM 116. Finally, the First Application 102 runs on the Mobile device 100 and may communicate with the MLTM 104 when it wishes to access functionality as described by the TCG Mobile Trusted Module Specification provided by the MLTM 104.

FIG. 1B illustrates another aspect of the prior art according to an embodiment of Japanese patent application 2008-264530 when the system comprises of an MRTM (Mobile Remote Trusted Module) and a tPCR (Transient PCR) Manager. The lower levels of the system are as for FIG. 1A; first of all there is the Mobile device 100 that consists of the components described below. Starting from the bottom of the diagram, there is an MRTM 116 that contains within it the RoTs (Roots of Trust) 118 as defined by the TCG Mobile Reference Architecture, and a set of PCRs 120. As illustrated in 122, the PCRs contain a number of individual PCRs; in this figure there are 16 in total, numbered from 0 to 15. Above the MRTM 116 are the First Boot Component 114 and the Second Boot Component 112 that perform various hardware and firmware initialisation functions and provide services to other components. Within the prior art these components are not illustrated as separate components, but grouped together as a single Secure Boot Components object. After these components is a tPCR (transient PCR) Manager 200, which also contains within it the RoTs (Roots of Trust) 106 as defined by the TCG Mobile Reference Architecture, and a set of transient PCRs 202. As illustrated in 204, the tPCRs contain a number of individual tPCRs; in this figure there are 16 in total, numbered from 0 to 15. Note that according to the prior art, these values are the base values of the tPCRs defined at the time of creation of the tPCR Manager 200; during operation of the tPCR Manager 200 the changes in tPCR values are recorded in a different manner. The two sets of PCRs 120 and 202, and two RoTs 106 and 118 operate independently, and according to the prior art the tPCR Manager 200 may delegate some functions to the MRTM 116. Finally, the First Application 102 runs on the Mobile device 100 and may communicate with the tPCR Manager 200 when it wishes to access functionality as described within Japanese patent application 2008-264530 provided by the tPCR Manager 200.

Figure 2:
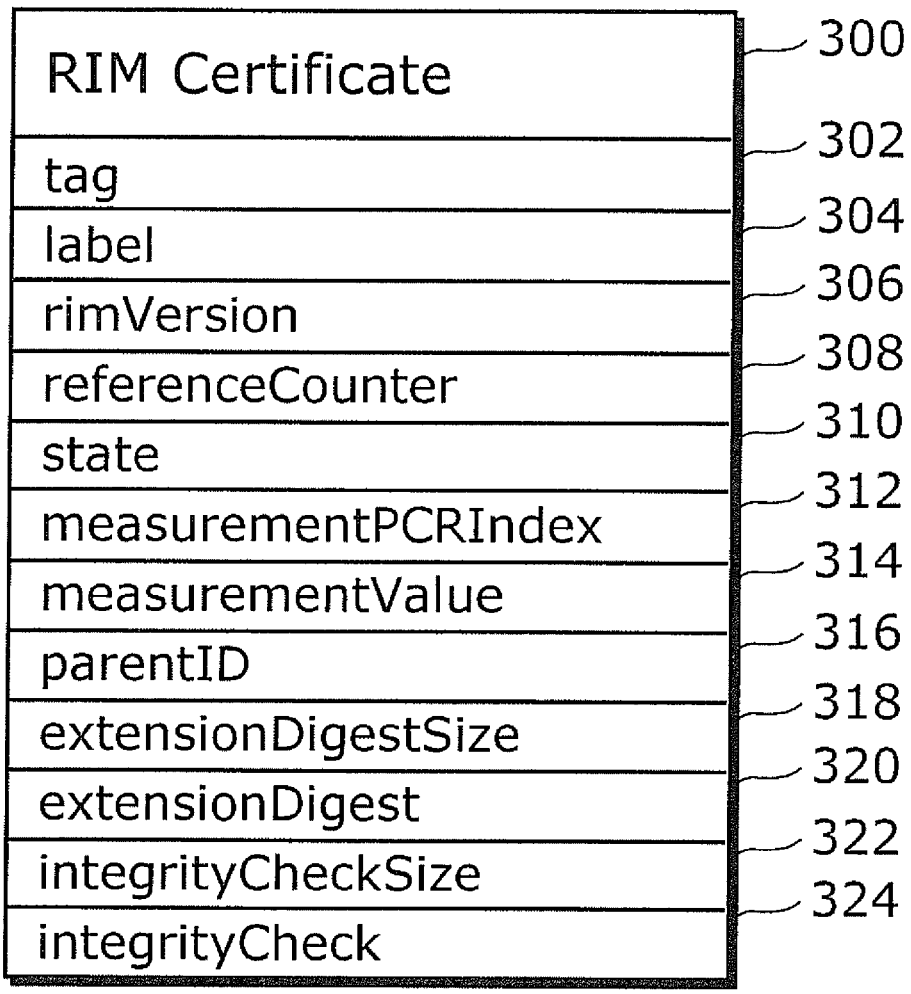
FIG. 2 illustrates a RIM Certificate according to the prior art.

FIG. 2 illustrates another aspect of the prior art, the RIM (Reference Integrity Metrics) Certificate structure 300 used to define the expected state of the PCR domain, described by a representation of the values of a set of PCRs stored within a PCR domain, and the state change, described by a value to extend into a named PCR within the same PCR domain, to execute on a successful verification of the state. The format of this structure is described in detail in the TCG Mobile Trusted Module Specification, so just to summarise, each structure starts of with a tag 302 that indicates that the type of this structure is a RIM Certificate. The label 304 contains an identifier for the RIM Certificate, rimVersion 306 holds a version number, referenceCounter 308 refers to a monotonic counter that protects the system against attacks such as rollback and reflash. state 310 contains a value and flags describing the state of the PCRs that must be present at the time of use of the certificate, measurementPCRIndex 312 and measurementValue 314 together define the state change to enact if the state 310 correctly describes the state of the system. In addition, according to the prior art, for certain certificates the measurementValue 314 contains a hash value of a module that requires verification. parentID 316 contains a key identifier to be used to verify the RIM Certificate's integrity, extensionDigestSize 318 and extensionDigest 320 describe a hash and its length for extension data defined within the certificate, and finally integrityCheckSize 322 and integrityCheck 324 describe a cryptographic hash of the structure that serve to verify that the structure has not been tampered with. In the present invention the usage of fields label 304, state 310, measurementPCRIndex 312 and measurementValue 314 are of particular interest; the other fields may be assumed to be set and used as according to the prior art.

Figure 3:
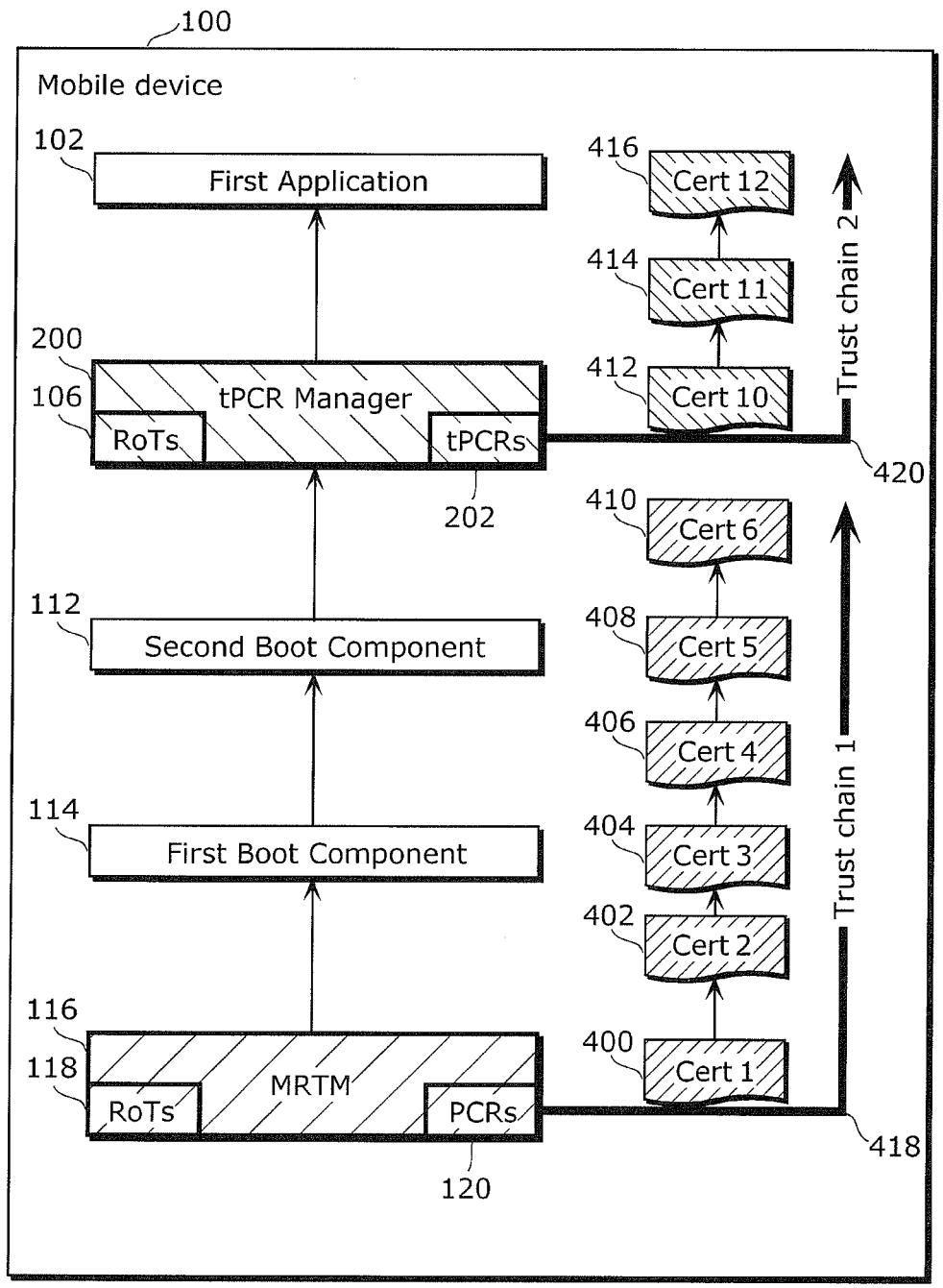
FIG. 3 illustrates how the trust chains are formed according to the prior art.

FIG. 3 illustrates another aspect of the prior art when the system comprises of an MRTM (Mobile Remote Trusted Module) and a tPCR (Transient PCR) Manager. Taking FIG. 1B as a base, the use of RIM Certificates according to the prior art is illustrated. As before the lower levels of the system are as for FIG. 1A; first of all there is the Mobile device 100 that consists of the components described below. Starting from the bottom of the diagram, there is an MRTM 116 that contains within it the RoTs (Roots of Trust) 118 as defined by the TCG Mobile Reference Architecture, and a set of PCRs 120. Above the MRTM 116 are the First Boot Component 114 and the Second Boot Component 112 that perform various hardware and firmware initialisation functions and provide services to other components. After these components is a tPCR (transient PCR) Manager 200, which also contains within it the RoTs (Roots of Trust) 106 as defined by the TCG Mobile Reference Architecture, and a set of transient PCRs 202. According to the prior art the tPCR Manager 200 may delegate some functions to the MRTM 116. Finally, the First Application 102 runs on the Mobile device 100 and may communicate with the tPCR Manager 200 when it wishes to access functionality provided by the tPCR Manager 200.

According to the prior art, within the system two distinct and separate trust chains are established through the use of verifying and extending RIM Certificates. The RIM Certificates Cert1 400, Cert2 402, Cert3 404, Cert4 406, Cert5 408 and Cert6 410, are used to test and extend the PCRs 120 within the MRTM 116 to build the Trust Chain 1 418. According to the prior art, Cert1 400 is for self-verification of the MRTM 116, Cert2 402 is used by the MRTM 116 to verify the First Boot Component 114 before launch. On launch of said component, Cert3 404 is used for self-verification, and this pattern of verify-launch-self-verify is repeated for Second Boot Component 112 using Cert4 406 and Cert5 408. Finally, Cert6 410 is used to verify the tPCR Manager 200 before launching. This sequence establishes a Trust Chain 1 418 extending from the PCRs 120 through all components up to the Second Boot Component 112. To highlight this trust chain, the MRTM 116, RoTs 118 and PCRs 120 have been shaded with diagonal lines running from bottom-left to top-right, and the certificates Cert1 400, Cert2 402, Cert3 404, Cert4 406, Cert5 408 and Cert6 410 have been similarly shaded, indicating that they verify and extend a state defined in the MRTM's PCRs 120.

The RIM Certificates Cert10 412, Cert11 414, and Cert12 416, are used to test and extend the tPCRs 202 within the tPCR Manager 200 to build the Trust Chain 2 420. Now, the tPCR Manager 200 executes and initialises the tPCRs 202 to their starting values, and then verifies itself using Cert10 412. When a request comes to launch the First Application 102, Cert 11 414 is used to verify the integrity of the First Application 102 and the state of the tPCRs 202, and then the certificate is extended and the application executed. The First Application 102 then verifies itself using Cert12 416, which tests and extends the state of the tPCRs 202. This sequence establishes a second disjoint Trust Chain 2 420 extending from the tPCRs 202 through all components up to the First Application 102. To highlight this trust chain, the tPCR Manager 200, RoTs 106 and tPCRs 202 have been shaded with diagonal lines running from top-left to bottom-right, and the certificates Cert10 412, Cert11 414 and Cert12 416 have been similarly shaded, indicating that they verify and extend a state defined in the tPCR Manager's tPCRs 202.

The following describes an information processing device according to an embodiment of the present invention.

Figure 4A:
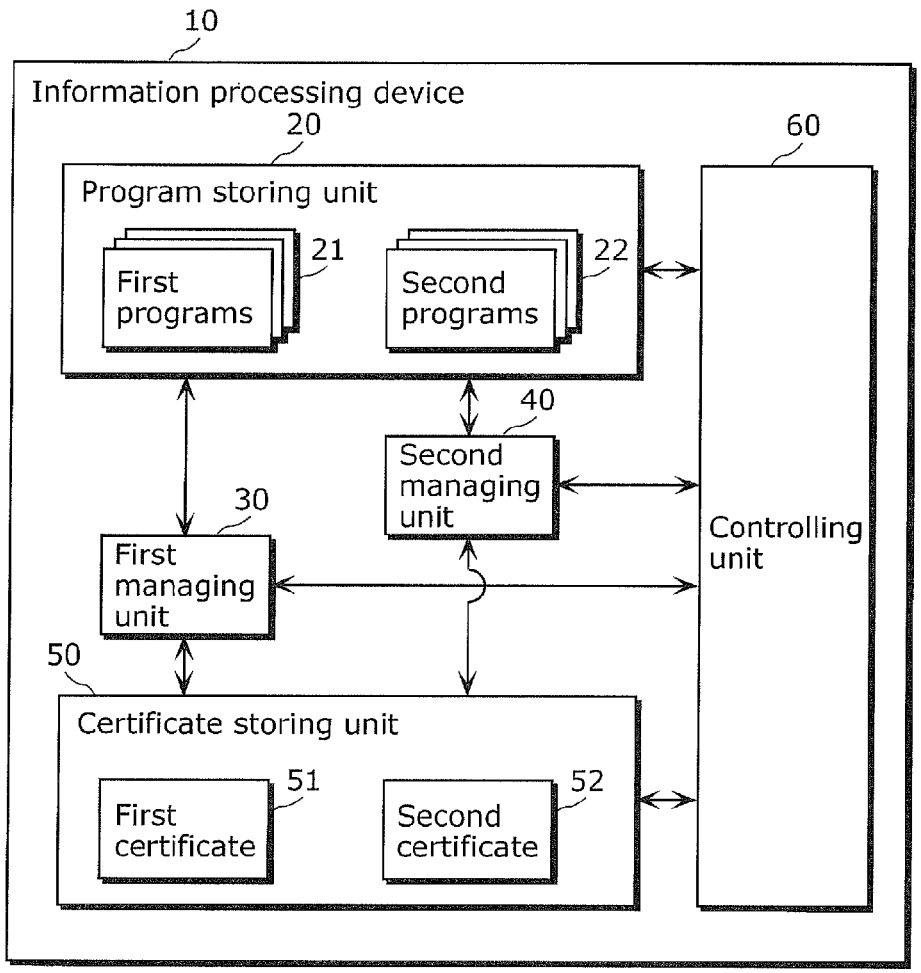
FIG. 4A illustrates a block diagram representing an example of the configuration of an information processing device according to an aspect of the present invention.

FIG. 4A illustrates a block diagram representing an example of the configuration of an information processing device 10 according to an aspect of the present invention. It is to be noted that the information processing device 10 is, for example, a mobile device 100.

The information processing device 10 as shown in FIG. 4A includes: a program storing unit 20; a first managing unit 30; a second managing unit 40; a certificate storing unit 50; and a controlling unit 60.

The program storing unit 20 is a memory or the like that stores plural first programs 21 and plural second programs 22. The program storing unit 20 is, for example, an internal memory included in the mobile device 100. It is to be noted that the program storing unit 20 is not illustrated in FIG. 5 described below. Further, FIG. 5 is a schematic view that explains how the trust chains are formed by the information processing device 10 according to the present invention.

The first programs 21 are plural programs expected to be booted in a first sequence.

Figure 5:
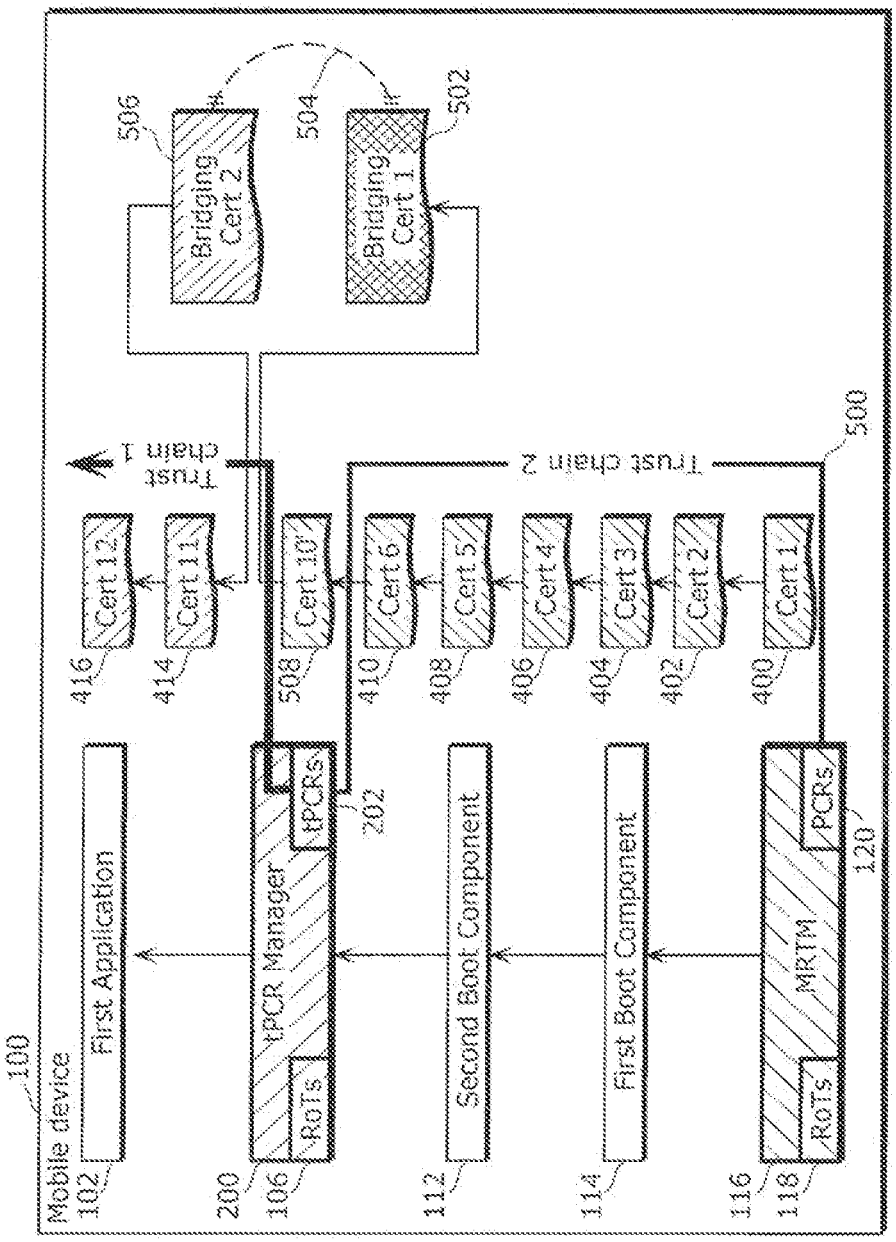
FIG. 5 illustrates how the trust chains are formed according to the present invention.

For example, the first programs 21 correspond to the First Boot Component 114 and the Second Boot Component 112 shown in FIG. 5.

The first programs 22 are plural programs expected to be booted in a second sequence. For example, one of the second programs 22 corresponds to a First Application 102 shown in FIG. 5.

The first managing unit 30 manages first accumulated information indicating one or more programs which have been booted among the first programs 21. For example, the first managing unit 30 corresponds to the MRTM 116 that manages a set of PCRs 120 shown in FIG. 5.

For example, the first managing unit 30 generates the first accumulated information by accumulating plural pieces of first representative information, and stores the generated first accumulated information into the set of PCRs 120. Each of the plural pieces of the first representative information represents a corresponding one of the programs booted in the first sequence. For example, the first representative information is a hash value calculated from each of the one or more programs which have been booted in the first sequence, or is a hash value of a character string showing that one of the one or more programs have been booted in the first sequence.

The second managing unit 40 manages second accumulated information indicating one or more programs which have been booted among the second programs 22. For example, the second managing unit 40 corresponds to the tPCR Manager 200 that manages a set of tPCRs 202 shown in FIG. 5.

For example, the second managing unit 40 generates the second accumulated information by accumulating plural pieces of second representative information, and stores the generated second accumulated information into the set of tPCRs 202. Each of the plural pieces of the second representative information represents a corresponding one of the programs that have been booted in the second sequence. For example, the second representative information is a hash value calculated from each of the one or more programs which have been booted in the second sequence, or is a hash value of a character string showing that one of the one or more programs have been booted in the second sequence.

The certificate storing unit 50 is a memory that stores a first certificate 51 and a second certificate 52. The first certificate 51 and the second certificate 52 are certificates used for splicing together a trust chain between the first sequence and the second sequence. More specifically, the first certificate 51 and the second certificate 52 are certificates to be used after all of the first programs 21 have been booted in the first sequence and before the second programs 22 are booted. It is to be noted that the certificate storing unit 50 is not illustrated in FIG. 5.

Figure 4B:
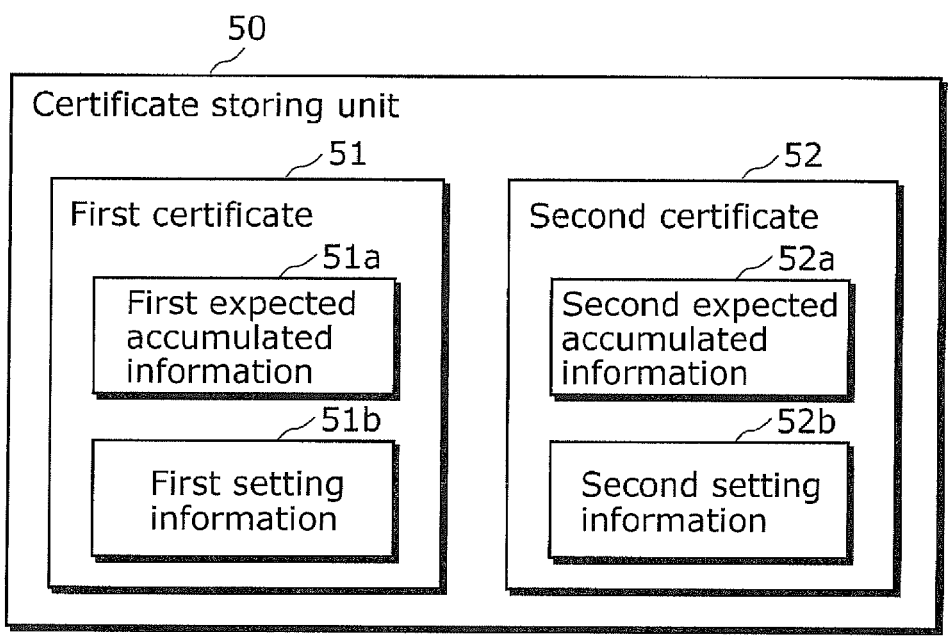
FIG. 4B illustrates a schematic view representing an example of a first certificate and a second certificate according to an aspect of the present invention.

FIG. 4B is a schematic view illustrating an example of the first certificate 51 and the second certificate 52.

The first certificate 51 includes first expected accumulated information 51a and first setting information 51b, as shown in FIG. 4B. The first certificate 51 is used to verify that all of the first programs 21 have been properly booted. For example, the first certificate 51 corresponds to a Bridging Cert 1 502 shown in FIG. 5. It is to be noted that the specific structure of the first certificate 51 is the same as the structure of a RIM certificate shown in FIG. 2.

The first expected accumulated information 51a is information indicating that all of the first programs 21 have been booted in the first sequence. For example, the first expected accumulated information 51a is a value which indicates a state of the set of PCRs 120 and is stored in the state 310 in the structure of the RIM certificate shown in FIG. 2. The first expected accumulated information 51a is information used for verifying the state of the set of PCRs 120, that is, verifying whether or not the first programs 21 have been booted properly in the first sequence.

The first setting information 51b is information that is expected to be the same as second setting information 52b included in the second certificate 52. More specifically, in the case where both the first certificate 51 and the second certificate 52 are proper certificates that have not been tampered, the first setting information 51b matches the second setting information 52b. That means the first setting information 51b is information used for verifying whether or not the first certificate 51 and the second certificate 52 are proper certificates. For example, the first setting information 51b is a value stored into the measurementValue 314 in the structure of the RIM certificate shown in FIG. 2, and is, for example, a hash value.

In addition, the second certificate 52 includes the second expected accumulated information 52a and second setting information 52b, as shown in FIG. 4B. The second certificate 52 is used for verifying that none of the second programs 22 have been booted. For example, the second certificate 52 corresponds to a Bridging Cert 2 506 shown in FIG. 5. It is to be noted that the specific structure of the second certificate 52 is the same as the structure of the RIM certificate shown in FIG. 2.

The second expected accumulated information 52a is information indicating that none of the second programs 22 have been booted. For example, the second expected accumulated information 52a is a value which indicates a state of the set of tPCRs 202 and is stored in the state 310 in the structure of the RIM certificate shown in FIG. 2. The second expected accumulated information 52a is information used for verifying the state of the set of tPCRs 202, that is, verifying whether or not none of the second programs have been booted.

The second setting information 52b is information indicating a value accumulated in the second accumulated information. For example, the second setting information 52b is a value stored into the measurementValue 314 in the structure of the RIM certificate shown in FIG. 2, and is, for example, a hash value.

Returning to FIG. 4A, the controlling unit 60 controls an operation of the information processing device 10 according to the present embodiment. To be specific, the controlling unit 60 performs verification and accumulates information by controlling the first managing unit 30 and the second managing unit 40 before the first program of the second sequence is booted, in the case where the last program of the first sequence has been booted. For example, the controlling unit 60 corresponds to a secure boot 600 in FIG. 6A and the like described below (not illustrated in FIG. 5). The following describes processing of the controlling unit 60 in detail.

The controlling unit 60 first determines whether or not the first accumulated information matches the first expected accumulated information by controlling the first managing unit 30 before the first program of the second sequence is booted in the case where the last program of the first sequence has been booted. That means the controlling unit 60 verifies that all of the first programs 21 have been booted in the first sequence by determining whether or not the state of the set of PCRs 120 matches the first expected accumulated information 51a included in the first certificate 51. The case where the state of the set of PCRs 120 matches the first expected accumulated information 51a indicates that all of the first programs 21 have been booted in the first sequence.

Further, the controlling unit 60 determines whether or not the second accumulated information matches the second expected accumulated information by controlling the second managing unit 40. More specifically, the controlling unit 60 verifies that none of the second programs 22 have been booted by determining whether or not the state of the set of tPCRs 202 matches the second expected accumulated information 52a included in the second certificate 52. The case where the state of the set of tPCRs 202 matches the second expected accumulated information 52a indicates that none of the second programs 22 have been booted.

Further, the controlling unit 60 verifies whether or not the first setting information matches the second setting information. More specifically, the controlling unit 60 verifies that the first certificate 51 and the second certificate 52 are proper certificates, by verifying whether or not the first setting information 51b included in the first certificate 51 matches the second setting information 52b included in the second certificate 52. The case where the first setting information 51b matches the second setting information 52b indicates that the first certificate 51 and the second certificate 52 are proper certificates.

In addition, the controlling unit 60 controls the second managing unit 40 so as to accumulate the second setting information 52b into the second accumulated information in the case where it is verified that: all of the first programs 21 have been booted in the first sequence; none of the second programs 22 have been booted; and the first setting information 51b matches the second setting information 52b. This allows the second accumulated information to indicate that all of the first programs 21 have been booted in the first sequence and none of the second programs 22 have been booted. More specifically, the controlling unit 60 controls the second managing unit 40 so as to reflect, into the state of the set of tPCRs 202, that all of the first programs 21 have been booted in the first sequence and none of the second programs 22 have been booted, by accumulating the second setting information 52b into the second accumulated information, that is, by extending the second setting information 52b through to the set of tPCRs 202.

In addition, the controlling unit 60 may control the first managing unit 30 so as to accumulate the first setting information 51b into the first accumulated information in the case where it is verified that: all of the first programs 21 have been booted in the first sequence; none of the second programs 22 have been booted; and the first setting information 51b matches the second setting information 52b. This allows the first accumulated information to indicate that all of the first programs 21 have been booted in the first sequence and none of the first programs 22 have been booted. More specifically, the controlling unit 60 controls the first managing unit 30 so as to reflect, into the state of the set of PCRs 120, that all of the first programs 21 have been booted in the first sequence and none of the second programs 22 have been booted, by accumulating the first setting information 51b into the first accumulated information, that is, by extending the first setting information 51b through to the set of PCRs 120.

The above configuration allows the information processing device 10 according to the present embodiment to splice together chains of trust between the first sequence and the second sequence by using the first certificate 51 and the second certificate 52, thereby enhancing trust while maintaining independence of the first sequence and the second sequence.

FIG. 5 illustrates the usage of RIM Certificates within the present invention, based upon the prior art described in FIG. 3. Comparing the two diagrams, the immediate differences that may be noted are that the previous Cert10 412 has become Cert10' 508 and the shading has changed to indicate that it now verifies and extends a state within the MRTM 116, and there are two new certificates Bridging Cert 1 502 and Bridging Cert 2 506. The detail of how these changes allow the new Trust Chain 1 500 to be built according to the present invention now follows.

As described for FIG. 3, the lower levels of the system are as for FIG. 1A; first of all there is the Mobile device 100 that consists of the components described below. Starting from the bottom of the diagram, there is an MRTM 116 that contains within it the RoTs (Roots of Trust) 118 as defined by the TCG Mobile Reference Architecture, and a set of PCRs 120. Above the MRTM 116 are the First Boot Component 114 and the Second Boot Component 112 that perform various hardware and firmware initialisation functions and provide services to other components. After these components is a tPCR (transient PCR) Manager 200, which also contains within it the RoTs (Roots of Trust) 106 as defined by the TCG Mobile Reference Architecture, and a set of transient PCRs 202. According to the prior art the tPCR Manager 200 may delegate some functions to the MRTM 116. Finally, the First Application 102 runs on the Mobile device 100 and may communicate with the tPCR Manager 200 when it wishes to access functionality provided by the tPCR Manager 200.

Next, the RIM Certificates Cert1 400, Cert2 402, Cert3 404, Cert4 406, Cert5 408 and Cert6 410, are used to test and extend the PCRs 120 within the MRTM 116. According to the prior art, Cert1 400 is for self-verification of the MRTM 116, Cert2 402 is used by the MRTM 116 to verify the First Boot Component 114 before launch. On launch of said component, Cert3 404 is used for self-verification, and this pattern of verify-launch-self-verify is repeated for Second Boot Component 112 using Cert4 406 and Cert5 408. Finally, Cert6 410 is used to verify the tPCR Manager 200 before launching.

Now, the tPCR Manager 200 executes and verifies itself using Cert10' 508, requesting the verification from the MRTM 116, thus adding the tPCR Manager 200 itself to the trust chain extending from the PCRs 120 in the MRTM 116. The tPCR Manager 200 performs other initialisations including setting the initial tPCRs 202 to defined starting values; in a preferred embodiment tPCR 0's initial value is set to a value representing the platform on which the tPCR Manager 200 is running, tPCR 1's initial value is a hash of the RoTs 106 within the tPCR Manager 200, and all other tPCRs initial values are set to zero.

To allow the chain of trust to bridge from the PCRs 120 to the tPCRs 202, resulting in a single continuous chain through the two PCR domains, the two RIM Certificates Bridging Cert 1 502 and Bridging Cert 2 506 are needed. The format of these RIM Certificates is identical to that illustrated in FIG. 2; it is the usage of them and specific values of the measurementPCRIndex 312 and measurementValue 314 fields that distinguish them from the other RIM Certificates. Bridging Cert 1 502 describes a PCR state that is verified within the MRTM 116, a state change that is to take place within the PCRs 120, and is protected by an integrity check value as described by the prior art that is verified by the MRTM 116; Bridging Cert 2 506 describes a tPCR state that is verified within the tPCR Manager 200, a state change that is to take place within the tPCRs 202, and is protected by an integrity check value as described by the prior art that is verified by the tPCR Manager 200. In the preferred implementation where the Bridging Cert 2 506 is an internal RIM Certificate as defined by the prior art and tPCR Manager 200 does not have protected storage space for key information, the verification of the integrity check value of the Bridging Cert 2 506 is delegated to the MRTM 116 component.

In addition, the bridge between the two separate domains is defined within these two certificates, and illustrated graphically by the line 504 linking the two bridging certificates. As illustrated in FIG. 2, within a RIM Certificate 300 there is a measurementPCRIndex 312 and a measurementValue 314 that together define the state change to enact. The certificate issuing authorities as described in the prior art agree between themselves on a certain value for these two fields and each generate their own certificates and deliver them to the device. Thus, during initialisation the tPCR Manager 200 retrieves both the Bridging Cert 1 502 and Bridging Cert 2 506, requests verification from the MRTM 116 that Bridging Cert 1 502 describes the current MRTM PCR 120 state, verifies itself that Bridging Cert 2 506 describes the current tPCR Manager tPCR 202 state, verifies that both Bridging Cert 1 502 and Bridging Cert 2 506 have identical values in the measurementPCRIndex 312 and a measurementValue 314, thus establishing that the bridge 504 can be built, then finally extends the measurementValue 314 into the measurementPCRIndex 312 within Bridging Cert 2 506, setting the new value as an initial state within the tPCR 202. Thus, the bridge between the MRTM PCRs 120 and the tPCRs 202 is established, extending the Trust chain 1 500 through to the tPCR 202.

The usage of certificates and tPCRs within the application space proceeds as described for FIG. 3, such that when a request comes to launch the First Application 102, Cert11 414 is used to verify the integrity of the First Application 102 and the state of the tPCRs 202, and then the certificate is extended and the application executed. The First Application 102 then verifies itself using Cert12 416, which tests the state of the tPCRs 202. This sequence establishes a second disjoint Trust Chain 2 420 extending from the tPCRs 202 through all components up to the First Application 102. Thus, once First Application 102 is executing, the Trust chain 1 500 is as illustrated, stretching all the way from the MRTM's PCRs 120 to the First Application 102.

Figure 6A:
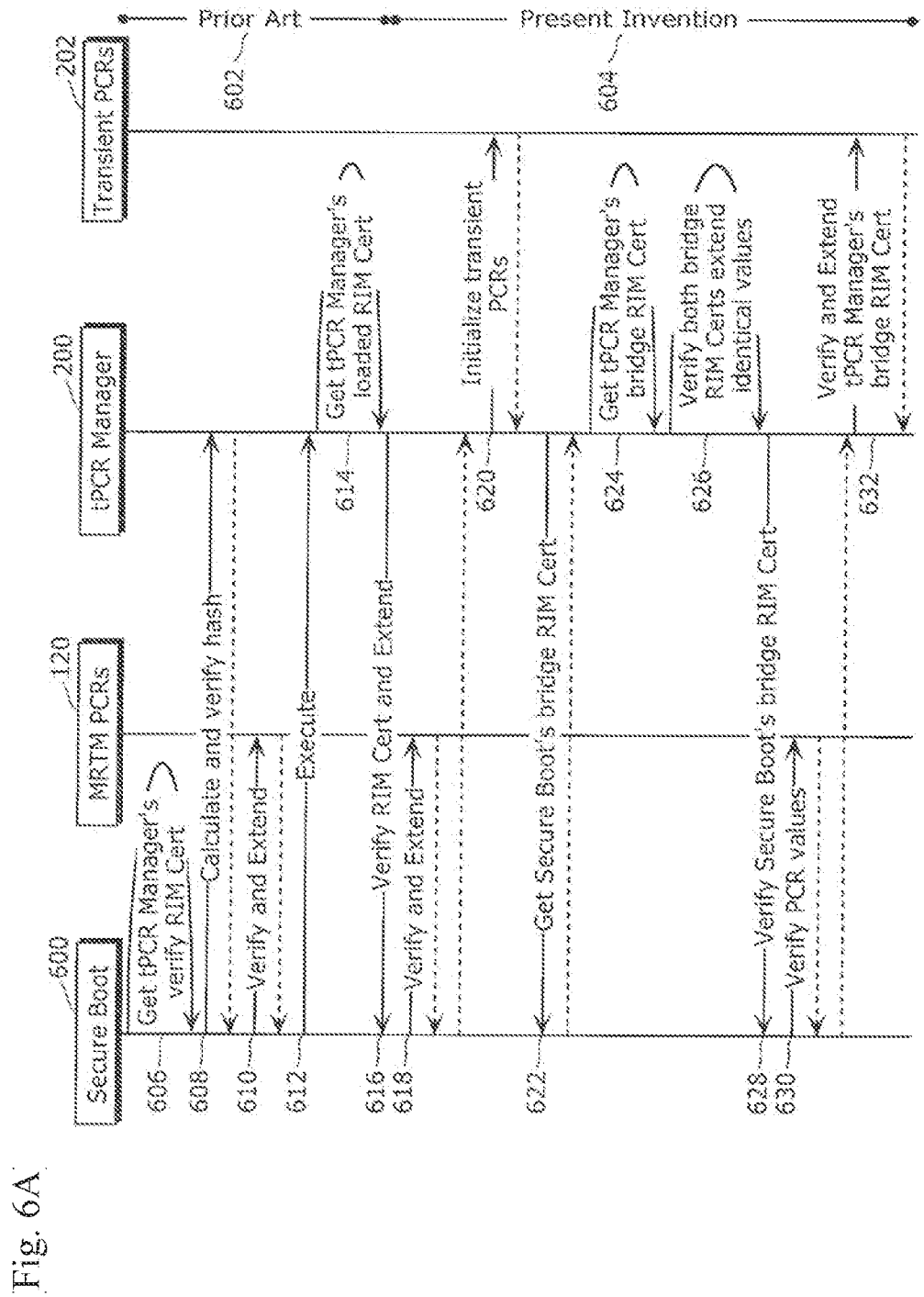
FIG. 6A illustrates the inter-module communication during the establishment of the bridge between PCR domains.

FIG. 6A illustrates the inter-module communication during the establishment of the bridge between PCR domains, based on FIG. 1B. The modules involved are Secure Boot 600, MRTM PCRs 120, tPCR Manager 200 and Transient PCRs 202. The Secure Boot 600 encompasses the facilities provided by the MRTM 116, First Boot Component 114 and Second Boot Component 112. On the right of the diagram the portions of this communication that are part of the Prior Art 602 and that are part of the Present Invention 604 are illustrated.

First, according to the prior art before launching the tPCR Manager module 200 the Secure Boot 600 module gets the tPCR Manager's pre-launch verification RIM Certificate 606 (this RIM Certificate is Cert6 410 in FIG. 5) and calculates and verifies the hash of the tPCR Manager's image with the RIM Certificate's value 608, and verifies and extends that RIM Certificate 610 into the MRTM PCRs 120. Control is then passed to the tPCR Manager 612. The tPCR Manager 200 next must self-verify according to the prior art, so it retrieves its own post-loading RIM Certificate 614 (this RIM Certificate is Cert10' 508 in FIG. 5). This finishes the communication according to the prior art, so the following is the communication according to the present invention.

As illustrated in FIG. 5, the self-verification RIM Certificate Cert10' 508 uses PCRs from the parent domain, here Secure Boot 600, so a request is sent to the Secure Boot for verification of the RIM Certificate and extending its value 616. The Secure Boot 600 then uses its own MRTM PCRs 120 to verify and extend the RIM Certificate 618. Now that the tPCR Manager 200 has proved that it is in the expected trusted environment, it can initialise its own transient PCRs 620 as described in the explanation of FIG. 3. Next, it requests from the Secure Boot the bridging RIM Certificate 622 and retrieves its own bridging RIM Certificate 624. These correspond respectively to Bridging Cert 1 502 and Bridging Cert 2 506 in FIG. 5. The tPCR Manager 200 then verifies that the two RIM Certificates have identical values 626 in the measurementPCRIndex 312 and a measurementValue 314, and requests the Secure Boot to confirm that the RIM Certificate that was retrieved in 622 is valid 628. As will be illustrated in more detail later, this operation 622 takes place over a secure channel in order to prevent tampering with the communication channel between the tPCR Manager 200 and the Secure Boot 600. According to the prior art, in the preferred implementation the Trusted Computing Group-defined protocol OSAP is used. The Secure Boot then verifies the PCR values 630 within Bridging Cert 1 502 against the values stored within the MRTM PCRs 120; note that in a preferred implementation the value to extend within the bridging RIM Certificate is not extended as the tPCR Manager 200 does not test the extended value within the MRTM PCRs 120. However, other implementations may extend the value into the MRTM PCRs 120, such as a case where a second PCR domain that is also child of the MRTM 116 wishes to test for the presence or absence of a first PCR domain through the MRTM PCRs 120. This is illustrated in FIG. 6B, described below.

Once the Secure Boot's bridging RIM Certificate has been successfully verified, the final step in extending the trust chain from the MRTM PCRs 120 to the Transient PCRs 202 is to verify and extend 632 the Bridging Cert 2 506 into the Transient PCRs 202, establishing a bridge between the two domains through the PCR described within the bridging RIM Certificates' measurementPCRIndex 312 and a measurementValue 314 values. Applications that wish to use the tPCR Manager can test this extended value, further extending the trust chain into these applications.

Figure 6B:
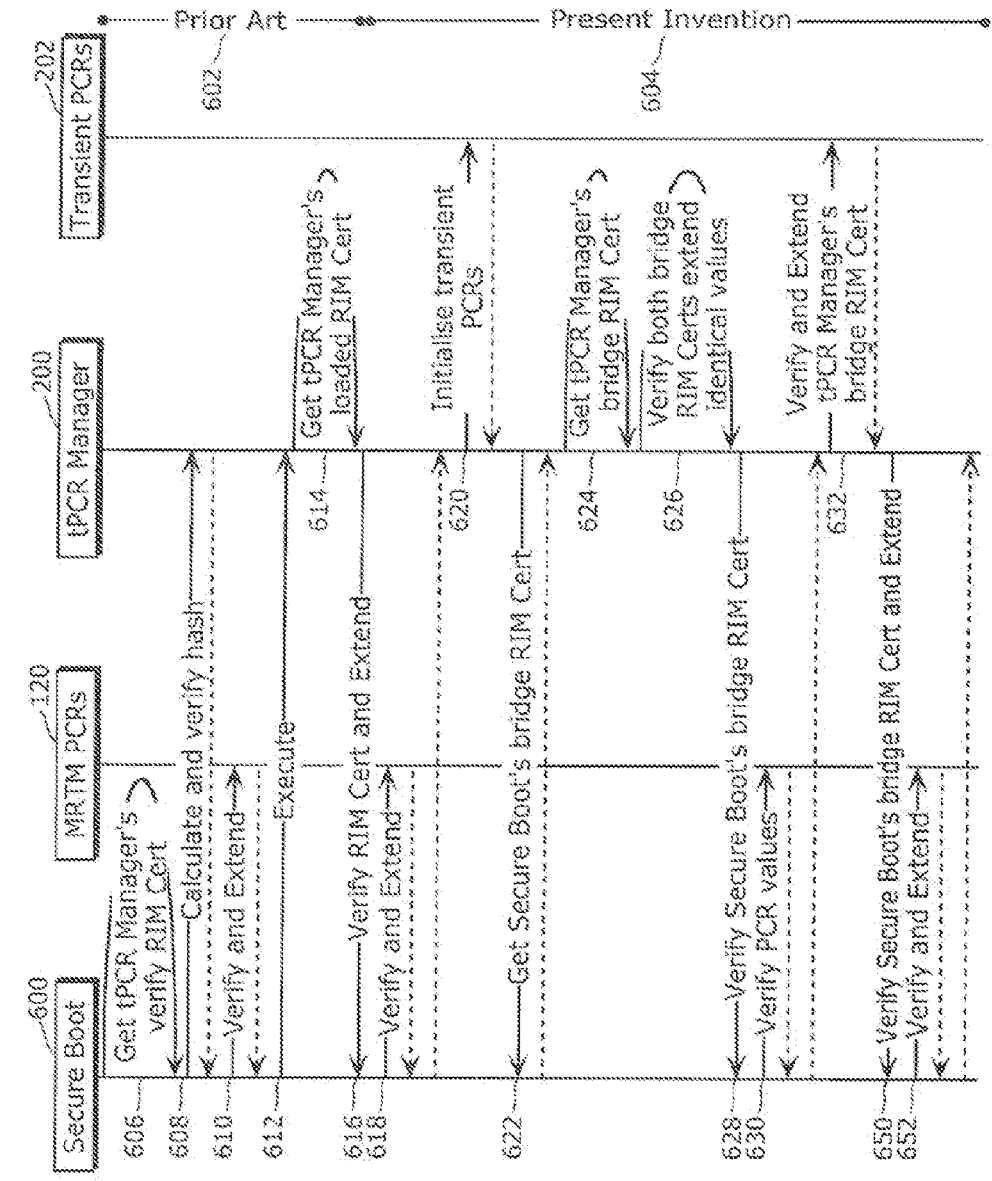
FIG. 6B illustrates another embodiment of the inter-module communication during the establishment of the bridge between PCR domains.

FIG. 6B illustrates another embodiment of the inter-module communication during the establishment of the bridge between PCR domains, based on FIG. 1B. The flow illustrated in this figure duplicates that for FIG. 6A above, with the additional final step of extending the parent domain's bridging RIM Certificate into the parent domain as a proof of the success of the bridging operation. After the trust chain from the MRTM PCRs 120 to the Transient PCRs 202 has been established by verifying and extending 632 the Bridging Cert 2 506 into the Transient PCRs 202, the tPCR Manager 200 requests the Secure Boot to reconfirm that the RIM Certificate that was retrieved in 622 is valid 650, and if so, extend into the parent domain's PCRs 120 the indicated measurementValue 314 value into the indicated measurementPCRIndex 312, as illustrated in 652.

Figure 7:
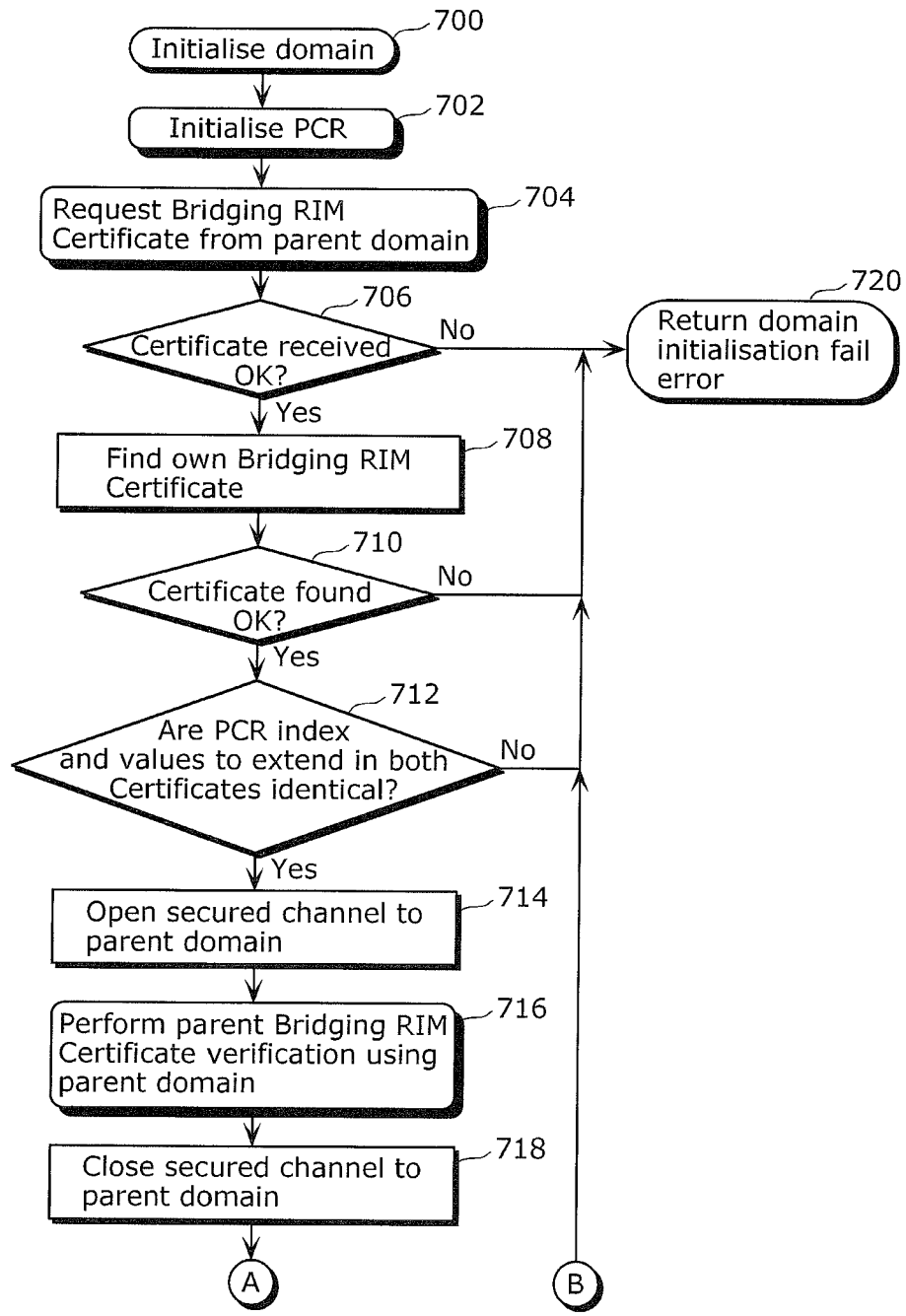
FIG. 7 illustrates the flow chart for initialising a PCR domain.
Figure 8A:
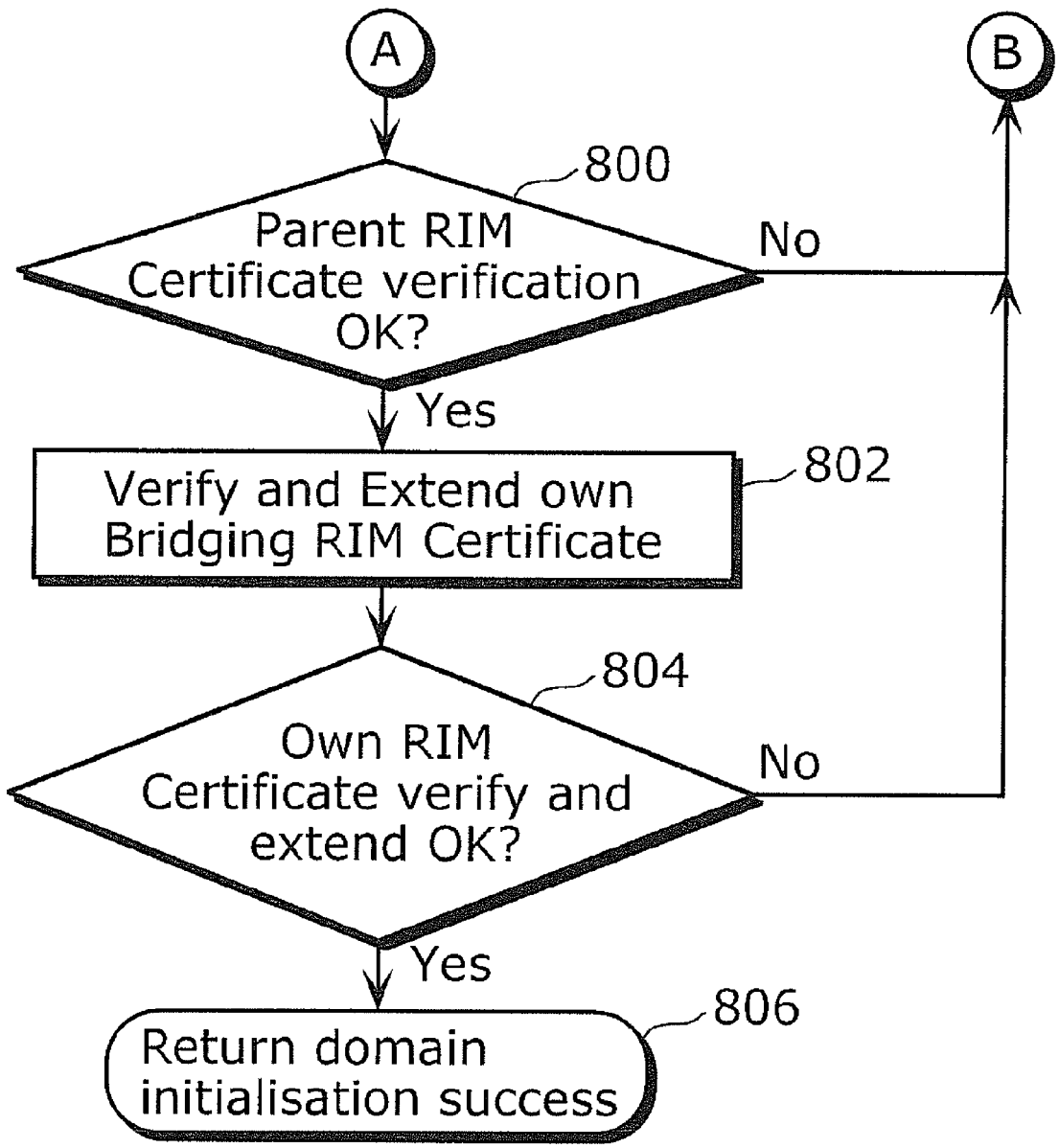
FIG. 8A illustrates the flow chart for initialising a PCR domain.

FIG. 7 and FIG. 8A illustrate the flow chart for initialising a PCR domain, based on the inter-module communication illustrated in FIG. 6A. Note that the flow charts describe not just the initialisation for a tPCR Manager 200, but the same process may also be used to initialise an MLTM 104, etc. This process starts from the point illustrated in FIG. 6A by the start of the Present Invention 604 line, the beginning of the initialisation of the domain 700. First, the PCRs are initialised to the base starting values 702 in a process that will be described later and the bridging RIM Certificate is requested from the parent domain 704. Relating this to FIG. 5, the requested certificate is Bridging Cert 1 502, and the parent domain is the MRTM 116 and associated modules. If the certificate was not received correctly 706, then an error is returned 720, causing the domain initialisation to fail. If it was OK, then the module's own RIM Certificate is retrieved (Bridging Cert 2 506), with a failure to find said certificate 710 results in an error being returned 720, causing the domain initialisation to fail. Next, the measurementPCRIndex 312 and measurementValue 314 fields of the two certificates are compared 712, and if they are not equal then an error is returned 720, causing the domain initialisation to fail. If they are equal, then next a secured communication channel to the parent domain is opened 714. According to the prior art, in the preferred implementation the Trusted Computing Group-defined protocol OSAP is used. Then, the bridging RIM Certificate from the parent domain is verified 716 in a process to be described later, and then the secure channel opened in 714 is closed 718.

The flowchart continues in FIG. 8A, with the result of the previous parent PCR domain's RIM Certificate verification in 716 being checked 800. If the check failed then an error is returned 720, causing the domain initialisation to fail. If it was successful, then finally the bridging RIM Certificate for the new domain is verified and extended within the new domain 802—according to FIG. 5, Bridging Cert 2 506 is verified by the tPCR Manager 200 and the resultant extended value is used as a base transient PCR value stored within the tPCRs 202. According to the prior art as described within Japanese patent application 2008-264530, the tPCR Manager 200 itself does not have a key that allows verification of the Bridging Cert 2's 506 integrityCheck 324 but instead delegates the integrity verification to the parent domain. In the preferred embodiment illustrated in FIG. 1A where the child domain is an MLTM 104, the verification may take place within the MLTM 104 itself.

If the verification and extend operation failed 804, as before an error is returned 720, causing the domain initialisation to fail. Otherwise, the domain initialisation routine returns a successful status code 806.

Figure 8B:
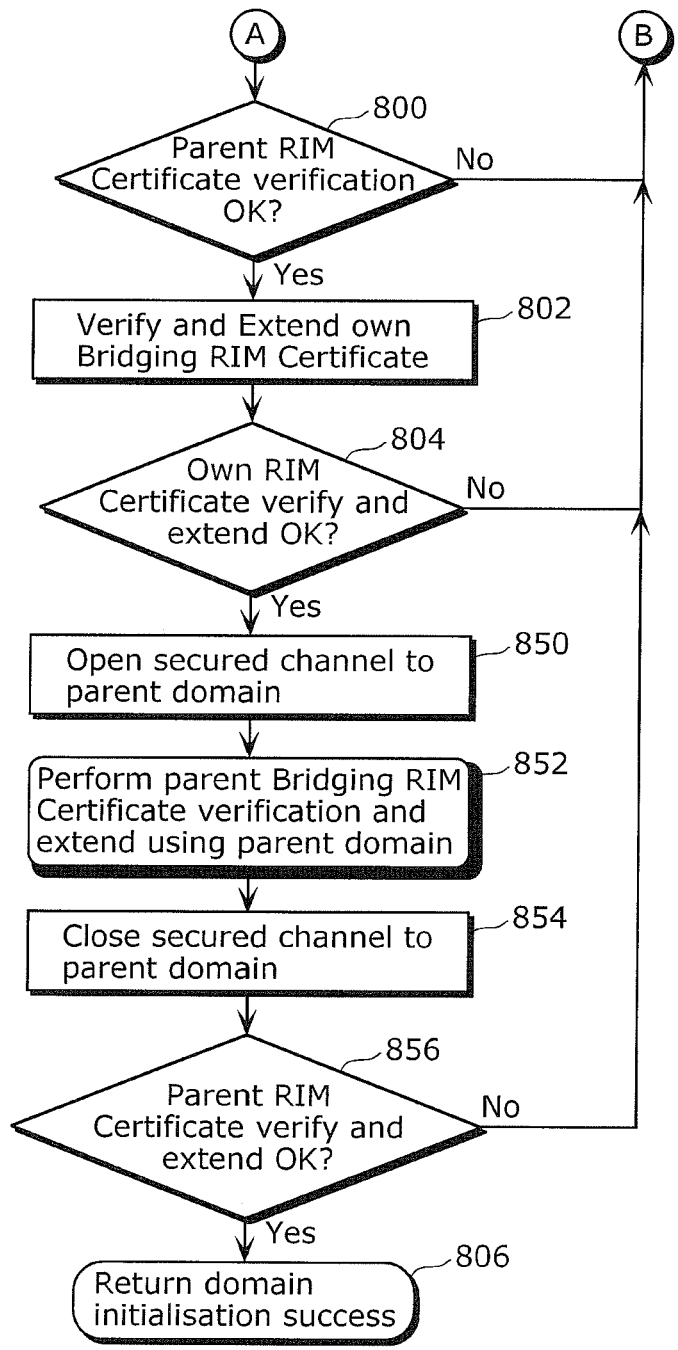
FIG. 8B illustrates another embodiment of the flow chart for initialising a PCR domain.

In another preferred embodiment a proof of the success of verifying and extending the bridging RIM Certificate for the new domain 802 is added to the parent domain. FIG. 7 and FIG. 8B illustrate the flow chart for initialising a PCR domain, based on the inter-module communication illustrated in FIG. 6B. The flow chart proceeds as described above to the checking that the verify and extend operation succeeded 804, but rather than returning a success code immediately as in FIG. 8A, a secured communication channel to the parent domain is opened 850. According to the prior art, in the preferred implementation the Trusted Computing Group-defined protocol OSAP is used. Then, the bridging RIM Certificate from the parent domain is verified and extended 852 using, in the preferred implementation, the Trusted Computing Group's Mobile Trusted Module MTM_VerifyRIMCertAndExtend API, and then the secure channel opened in 850 is closed 854. If the verification and extend operation failed 856, as before an error is returned 720, causing the domain initialisation to fail. Otherwise, the domain initialisation routine returns a successful status code 806.

Figure 9:
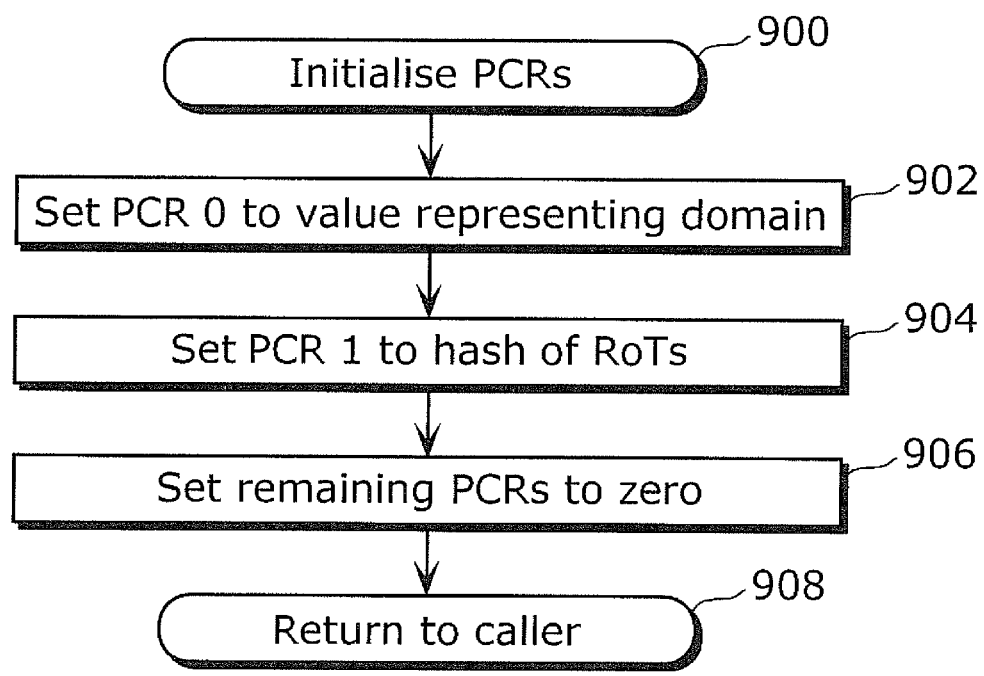
FIG. 9 illustrates the flow chart for initialising the PCRs in a PCR domain.

FIG. 9 illustrates the flow chart for initialising the PCRs in a PCR domain. This straightforward process of initialising the PCRs 900 starts with setting PCR 0 to a value representing the PCR domain 902. According to the prior art, this is "relevant characteristics of the HW platform"; for an MLTM or a tPCR Manager implemented in software such a value may not be appropriate, so it can be replaced by, for example, a hash of a string identifying the application and the revision level, such as "Panasonic tPCR Manager v1". Next, PCR 1 is initialised to a hash of the RoTs 904, the block RoTs 106 illustrated in FIG. 1A and FIG. 1B. Finally, the remaining PCRs are initialised to zero 906, and the process returns to the caller 908.

Figure 10:
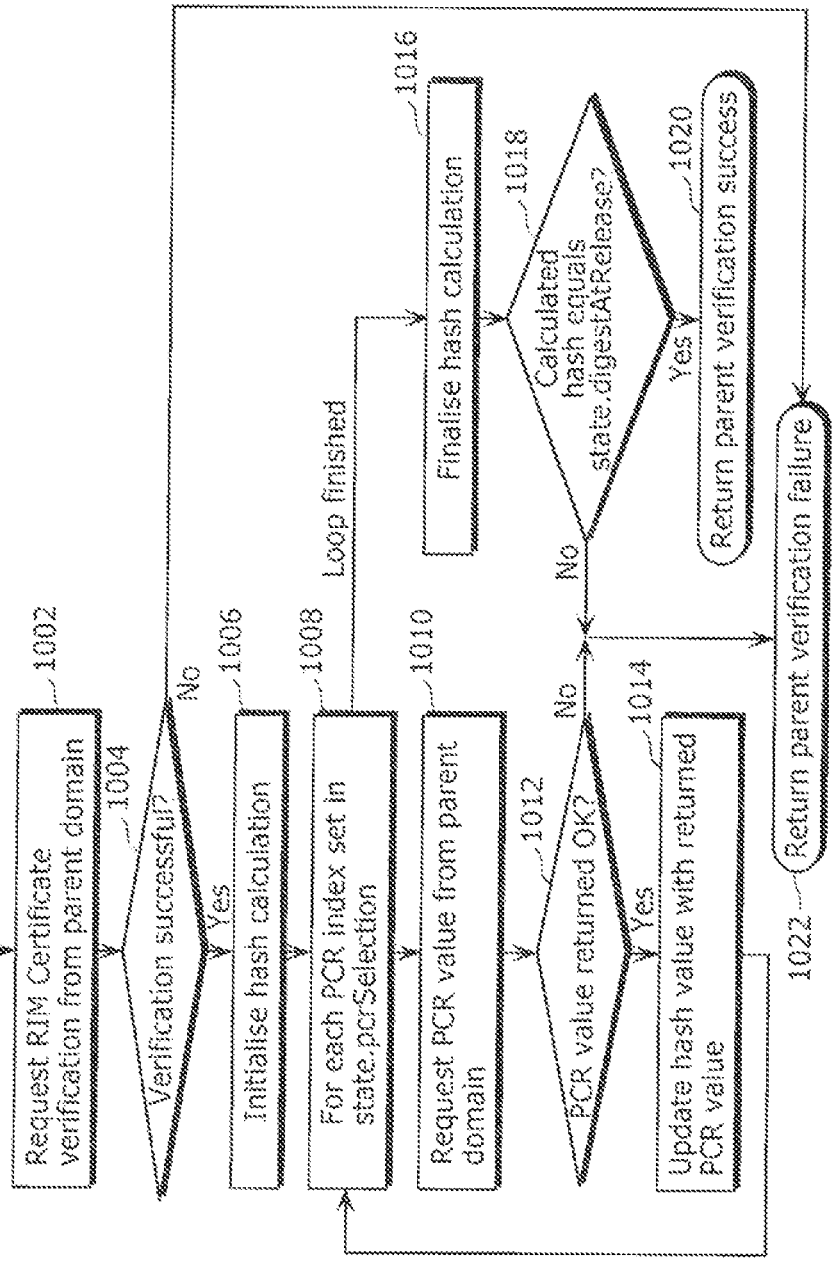
FIG. 10 illustrates the flow chart for verifying a RIM Certificate for the parent domain.

FIG. 10 illustrates the flow chart for verifying a RIM Certificate for the parent domain, implementing the process described at 716 in FIG. 7. The requirement for the process is to calculate a hash value of actual PCR values and compare it with a saved hash value. The routine starts at 1000 then first requests RIM Certificate verification from the parent domain 1002. In a preferred implementation this used the API MTM-_VerifyRIMCert to check that the fields within the RIM Certificate structure 300 are correctly set up and that the integrityCheckSize 322 and integrityCheckData 324 contain a valid signature for the structure. Note that this step does not perform any validation of the actual PCR values defined by the state field 310. If this verification is unsuccessful 1004 the process returns a verification failure error to the calling process 1022. Otherwise, the hash of the individual fields defined within state field 310 need to be checked to see if the actual PCRs 120 are set to the expected values. To do this, first the hash calculation is initialised 1006, then for each bit set within the state.pcrSelection 310 field 1008 the value of the PCR index corresponding to this bit is requested from the parent domain 1010. If there is a failure to retrieve the data 1012 the process returns a verification failure error to the calling process 1022, otherwise the returned PCR value is added into the composite hash of all the PCR values 1014. This loop repeats until all the bits in state.perSelection 310 representing PCRs have been tested. To perform the final verification, the hash calculation is finalised 1016 and the calculated hash is compared with the stored hash within state- .digestAtRelease 310. If the fields are not equal 1018 the process returns a verification failure error to the calling process 1022, otherwise the parent RIM certificate has been found to be valid, so a successful verification code is returned to the calling process 1020.

Figure 11:
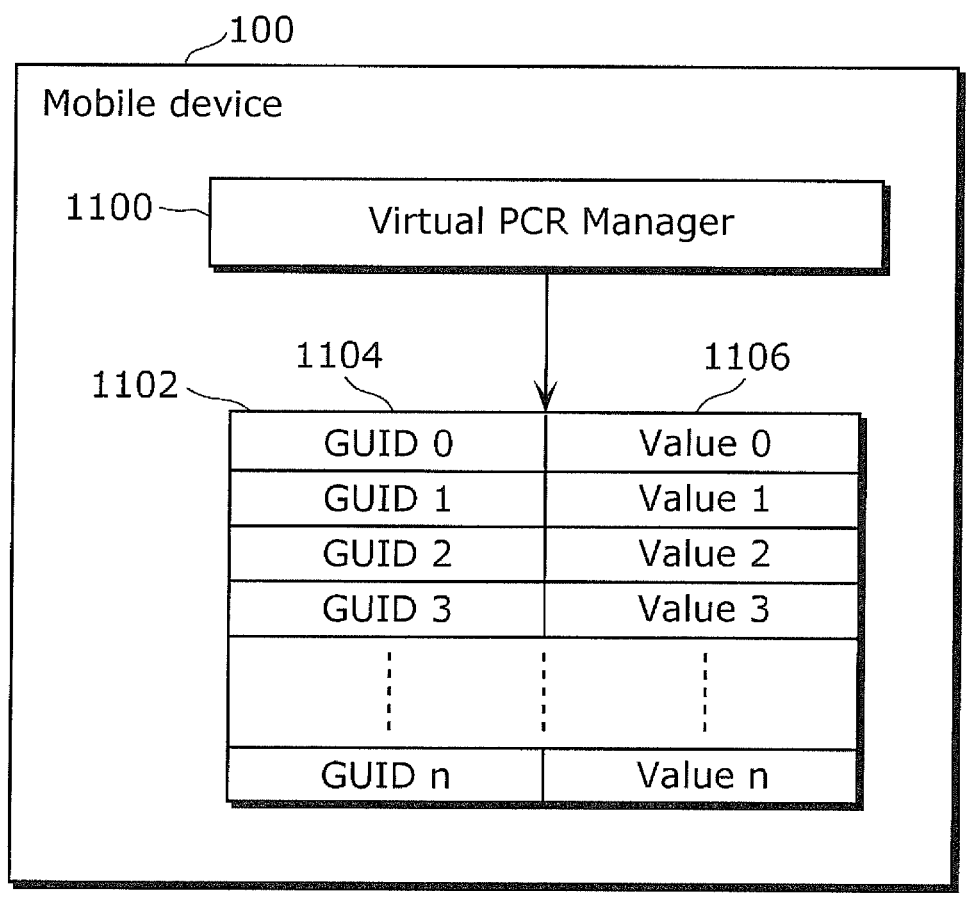
FIG. 11 illustrates virtual PCRs according to the prior art.

FIG. 11 illustrates an aspect of the prior art according to US Patent Application No 2006/0212939 A1 (Patent Literature 1). Within the Mobile device 100 there is a Virtual PCR Manager 1100 which manages a table 1102 with two columns, the first being identifiers for virtual PCRs, with GUIDs (Global Unique Identifiers) being one embodiment 1104. The second column is the actual virtual PCR value 1106.

Figure 12:
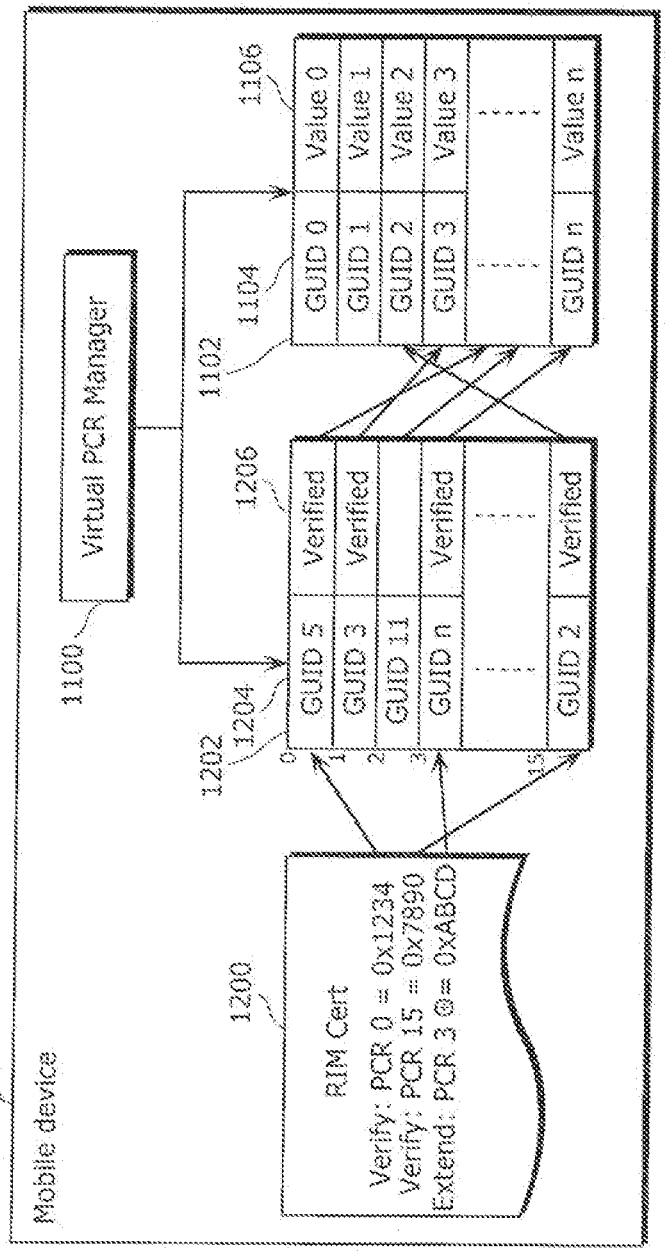
FIG. 12 illustrates virtual PCRs and RIM Certificates according to the present invention.

FIG. 12 illustrates virtual PCRs and RIM Certificates according to the present invention. As illustrated in FIG. 11 there is a Virtual PCR Manager 1100 which manages a table 1102 with two columns, the first being identifiers for virtual PCRs, with GUIDs (Global Unique Identifiers) being one embodiment 1104. The second column is the actual virtual PCR value 1106. In order to translate PCR references in a given RIM Certificate 1200 from an index number to a GUID, a new table for mapping indices to GUIDs 1202 is defined. This table is created by the Virtual PCR Manager 1100 during initialisation of that component and contains two columns. The first column contains GUIDs 1204 that refer to GUIDs 1104 within the GUID to value table 1102. The ordering of this table 1202 is important (unlike the table according to the prior art 1102, which has no specific ordering) as the first row of the table corresponds to PCR 0 in the RIM Certificate 1200, so by retrieving the GUID stored within the table 1202, the corresponding PCR value can be retrieved from table 1102. The second column 1206 of the table 1202 contains an indicator to show if the PCR for this row is verified. This column embodies MTM_PERMANENT_DATA→verifiedPCRs as defined within the TCG Mobile Trusted Module Specification. One ordinarily-skilled in the art will see that other implementations of this column 1206 are possible, such as a bitmap similar to that described above according to the prior art.

Additionally, whenever a client requests the Virtual PCR Manager perform a trans-formation on a virtual PCR within table 1102, the table 1202 must be checked to ensure that the requested virtual PCR's GUID is not a Verified virtual PCR. In a preferred embodiment the column of GUIDs 1204 are randomly generated on initialisation of the Virtual PCR Manager 1100, thus are unknown to clients. In the table 1202 illustrated, the blank entry in column 1206 for GUID 11 indicates a non-verified PCR.

As described above, in the information processing device 10 according to the present embodiment, the second certificate 52 may include a register identifier that indicates that in which register of the set of tPCRs 202 the second accumulated information to be compared with the second expected accumulated information 52a should be stored. To be specific, the register identifier described here corresponds to "0" and "15", such as "PCR 0" and "PCR 15" in the RIM certificate 1200 in the example shown in FIG. 12, for example.

Further, the second managing unit 40 only needs to manage a mapping table (the table 1202 shown in FIG. 12) indicating the correspondence between the virtual identifier and the register identifier. The virtual identifier corresponds to GUID1204 in the example shown in FIG. 12.

Further, the second managing unit 40 stores the second accumulated information into a storing area specified using the virtual identifier, instead of the register.

Furthermore, the second managing unit 40, when controlled so as to verify that none of the second programs have been booted, retrieves the storing area in which the second accumulated information is stored, by using the register identifier and the mapping table included in the second certificate 52.

As described above, the present invention can also be applied to the case where the virtual identifier such as GUID and the mapping table are used.

It should be noted that although the present invention is described based on the aforementioned embodiment, the present invention is obviously not limited to such embodiment. The following cases are also included in the present invention.

(1) The aforementioned embodiment follows the requirements of the Mobile Trusted Module and Secure Boot specifications. However, the present invention can be applied to a system containing a Trusted Platform Module and/or supporting Trusted Boot specification as defined by the Trusted Computing Group's TCG Infrastructure Working Group Architecture Part II—Integrity Management Specification Version 1.0.

(2) In the aforementioned embodiment, the verification is performed in a similar manner to the MTM specifications. However, the present invention can be applied to another verification system, as long as the verification system can verify the components of the system using a verification method in which the component are verified like a chain (i.e. one component verifies another component which launch after the one component). For example, extending the hash value into MTM may be omitted, because this operation is specific for TCG specification.

(3) In the aforementioned embodiment, the verification is performed by using hash values in a certificate (RIM Certificate). However, another verification method which does not use hash values may be applied to present invention.

Conventional check sum or other data extracted from the component (for example, a first predetermined bits extracted from the component) may be used to perform verification. Furthermore, the certificate may be replaced by a data group that includes the integrity check values.

In addition, the verification method is not limited to check whether or not a value extracted from the component and an expected value match. For example, checking the size of the component, and if the size is larger or smaller than a predetermined amount the component may be judged to be verified. These verification methods are not as strict as comparing a hash value with its expected value, however they are faster to perform.

(4) Each of the aforementioned apparatuses is, specifically, a computer system including a microprocessor, a ROM, a RAM, a hard disk unit, a display unit, a keyboard, a mouse, and the so on. A computer program is stored in the RAM or hard disk unit. The respective apparatuses achieve their functions through the microprocessor's operation according to the computer program. Here, the computer program is configured by combining plural instruction codes indicating instructions for the computer.

(5) A part or all of the constituent elements constituting the respective apparatuses may be configured from a single System-LSI (Large-Scale Integration). The System-LSI is a super-multi-function LSI manufactured by integrating constituent units on one chip, and is specifically a computer system configured by including a microprocessor, a ROM, a RAM, and so on. A computer program is stored in the RAM. The System-LSI achieves its function through the microprocessor's operation according to the computer program.

Furthermore, each unit of the constituent elements configuring the respective apparatuses may be made as separate individual chips, or as a single chip to include a part or all thereof.

Furthermore, here, System-LSI is mentioned but there are instances where, due to a difference in the degree of integration, the designations IC, LSI, super LSI, and ultra LSI are used.

Furthermore, the means for circuit integration is not limited to an LSI, and implementation with a dedicated circuit or a general-purpose processor is also available. In addition, it is also acceptable to use a Field Programmable Gate Array (FPGA) that is programmable after the LSI has been manufactured, and a reconfigurable processor in which connections and settings of circuit cells within the LSI are reconfigurable.

Furthermore, if integrated circuit technology that replaces LSI appear thorough progress in semiconductor technology or other derived technology, that technology can naturally be used to carry out integration of the constituent elements. Biotechnology is anticipated to apply.

(6) A part or all of the constituent elements constituting the respective apparatuses may be configured as an IC card which can be attached and detached from the respective apparatuses or as a stand-alone module. The IC card or the module is a computer system configured from a microprocessor, a ROM, a RAM, and the so on. The IC card or the module may also be included in the aforementioned super-multi-function LSI. The IC card or the module achieves its function through the microprocessor's operation according to the computer program. The IC card or the module may also be implemented to be tamper-resistant.

(7) The present invention, may be a computer program for realizing the previously illustrated method, using a computer, and may also be a digital signal including the computer program.

Furthermore, the present invention may also be realized by storing the computer program or the digital signal in a computer readable recording medium such as flexible disc, a hard disk, a CD-ROM, an MO, a DVD, a DVD-ROM, a DVD-RAM, a BD (Blu-ray Disc), and a semiconductor memory. Furthermore, the present invention also includes the digital signal recorded in these recording media.

Furthermore, the present invention may also be realized by the transmission of the aforementioned computer program or digital signal via a telecommunication line, a wireless or wired communication line, a network represented by the Internet, a data broadcast and so on.

The present invention may also be a computer system including a microprocessor and a memory, in which the memory stores the aforementioned computer program and the microprocessor operates according to the computer program.

Furthermore, by transferring the program or the digital signal by recording onto the aforementioned recording media, or by transferring the program or digital signal via the aforementioned network and the like, execution using another independent computer system is also made possible.

(8) Those skilled in the art will readily appreciate that many modifications are possible in the exemplary embodiment without materially departing from the novel teachings and advantages of this invention. Accordingly, arbitrary combination of the aforementioned modifications and embodiment is included within the scope of this invention.

INDUSTRIAL APPLICABILITY

The present invention can be used for information and telecommunications devices that update program data, such as personal computers, mobile phones, audio players, television sets, video recorder, and the like, household electrical appliances, and the like.

REFERENCE SIGNS LIST 10 information processing device
20 program storing unit
21 first programs
22 second programs
30 first managing unit
40 second managing unit
50 certificate storing unit
51 first certificate
51a first expected accumulated information
51b first setting information
52 second certificate
52a second expected accumulated information
52b second setting information
60 controlling unit
100 mobile device
102 First Application
104 MLTM
106, 118 RoT
108, 120 set of PCRs
110, 122 PCR
112 Second Boot Component
114 First Boot Component
116 MRTM
200 tPCR manager
202 set of tPCRs

The invention claimed is:

1. An information processing device comprising:
a program storing unit configured to store a plurality of programs including first programs and second programs, the first programs being a plurality of programs expected to be booted in a first sequence, and the second programs being a plurality of programs expected to be booted in a second sequence;
a first managing unit configured to manage first accumulated information, the first accumulated information indicating one or more programs which have been booted among the first programs;
a second managing unit configured to manage second accumulated information, the second accumulated information indicating one or more programs which have been booted among the second programs, the second managing unit being distinct from the first managing unit;
a certificate storing unit configured to store first certificate and second certificate, the first certificate including first expected accumulated information and first setting information, the second certificate including second expected accumulated information and second setting information, the first expected accumulated information indicating that all of the first programs have been booted in the first sequence, the second expected accumulated information indicating that none of the second programs have been booted, the first setting information being expected to be identical to the second setting information, the second setting information being a value to be accumulated into the second accumulated information;
a controlling unit, when last program in the first sequence has booted and before initial program in the second sequence is booted, configured to:
(i) control the first managing unit to verify that all of the first programs have been booted in the first sequence when the first accumulated information matches the first expected accumulated information;
(ii) control the second managing unit to verify that none of the second programs have been booted when the second accumulated information matches the second expected accumulated information;
(iii) verify that the first setting information matches the second setting information; and (iv) control the second managing unit to accumulate the second setting information into the second accumulated information in order to indicate that all of the first programs have been booted in the first sequence and none of the second programs have been booted, when it is verified that (a) all of the first programs have been booted in the first sequence, (b) none of the second programs have been booted, and (c) the first setting information matches the second setting information.

2. The information processing device of claim 1, wherein, said controlling unit further controls the first managing unit to accumulate the first setting information into the first accumulated information in order to indicate that all of the first programs have been booted in the first sequence and none of the second programs have been booted, when it is verified that (a) all of the first programs have been booted in the first sequence, (b) none of the second programs have been booted, and (c) the first setting information matches the second setting information.

3. The information processing device of claim 1 wherein, said first managing unit generates the first accumulated information by accumulating a plurality of pieces of first representative information and stores the generated first accumulated information, each of the plurality of pieces of the first representative information representing one of the plurality of the programs that have been booted in the first sequence;
said second managing unit generates the second accumulated information by accumulating a plurality of pieces of second representative information and stores the generated second accumulated information in a manner different from said first managing unit, each of the plurality of pieces of the second representative information representing one of the plurality of the programs that have been booted in the second sequence.

4. The information processing device of claim 3 wherein, the second certificate includes a register identifier indicating that in which register the second accumulated information to be compared with the second expected accumulated information is to be stored;
said second managing unit (i) stores the second accumulated information in a storing area instead of the register, the storing area being identified by virtual identifier, (ii) manages a mapping table showing correspondence between the virtual identifier and the register identifier, (iii) searches, when the second managing unit is controlled to verify that none of the second programs have been booted, the storing area storing the second accumulated information by using the register identifier included in the second certificate and the mapping table.

5. The information processing device of claim 3 wherein, each piece of the first representative information is a hash value calculated from each of one or more programs which have been booted in the first sequence, or is a hash value of a character string showing that one of the one or more programs has been booted in the first sequence.

6. The information processing device of claim 3 wherein, each piece of the second representative information is a hash value calculated from each of one or more programs which have been booted in the second sequence, or is a hash value of a character string showing that one of the one or more programs has been booted in the second sequence.

7. The information processing device of claim 1 wherein, the first managing unit manages the first accumulated information using one of PCRs, transient PCRs, and virtual PCRs; and the second managing unit manages the second accumulated information using one of PCRs, transient PCRs, and virtual PCRs.

8. An information processing method used for an information processing device, the information processing device comprising
a program storing unit configured to store a plurality of programs including first programs and second programs, the first programs being a plurality of programs expected to be booted in a first sequence, and the second programs being a plurality of programs expected to be booted in a second sequence;
a first managing unit configured to manage first accumulated information, the first accumulated information indicating one or more programs which have been booted among the first programs;
a second managing unit configured to manage second accumulated information, the second accumulated information indicating one or more programs which have been booted among the second programs, the second managing unit being distinct from the first managing unit;
a certificate storing unit configured to store first certificate and second certificate, the first certificate including first expected accumulated information and first setting information, the second certificate including second expected accumulated information and second setting information, the first expected accumulated information indicating that all of the first programs have been booted in the first sequence, the second expected accumulated information indicating that none of the second programs have been booted, the first setting information being expected to be identical to the second setting information, the second setting information being a value to be accumulated into the second accumulated information; and, the information processing method comprising:
a controlling step of, when last program in the first sequence has booted and before initial program in the second sequence is booted:
(i) controlling the first managing unit to verify that all of the first programs have been booted in the first sequence when the first accumulated information matches the first expected accumulated information;
(ii) controlling the second managing unit to verify that none of the second programs have been booted when the second accumulated information matches the second expected accumulated information;
(iii) verifying that the first setting information matches the second setting information; and
(iv) controlling the second managing unit to accumulate the second setting information into the second accumulated information in order to indicate that all of the first programs have been booted in the first sequence and none of the second programs have been booted, when it is verified that (a) all of the first programs have been booted in the first sequence, (b) none of the second programs have been booted, and (c) the first setting information matches the second setting information.

9. A non-transitory recording medium having recorded thereon an information processing program used for an information processing device,
the information processing device comprising
a program storing unit configured to store a plurality of programs including first programs and second programs, the first programs being a plurality of programs expected to be booted in a first sequence, and the second programs being a plurality of programs expected to be booted in a second sequence;

a first managing unit configured to manage first accumulated information, the first accumulated information indicating one or more programs which have been booted among the first programs;

a second managing unit configured to manage second accumulated information, the second accumulated information indicating one or more programs which have been booted among the second programs, the second managing unit being distinct from the first managing unit;

a certificate storing unit configured to store first certificate and second certificate, the first certificate including first expected accumulated information and first setting information, the second certificate including second expected accumulated information and second setting information, the first expected accumulated information indicating that all of the first programs have been booted in the first sequence, the second expected accumulated information indicating that none of the second programs have been booted, the first setting information being expected to be identical to the second setting information, the second setting information being a value to be accumulated into the second accumulated information; and, the information processing program causes the information processing device to, when last program in the first sequence has booted and before initial program in the second sequence is booted:

(i) control the first managing unit to verify that all of the first programs have been booted in the first sequence when the first accumulated information matches the first expected accumulated information;

(ii) control the second managing unit to verify that none of the second programs have been booted when the second accumulated information matches the second expected accumulated information;

(iii) verify that the first setting information matches the second setting information; and (iv) control the second managing unit to accumulate the second setting information into the second accumulated information in order to indicate that all of the first programs have been booted in the first sequence and none of the second programs have been booted, when it is verified that (a) all of the first programs have been booted in the first sequence, (b) none of the second programs have been booted, and (c) the first setting information matches the second setting information.

10. An integrity device used in an information processing device, the information processing device comprising a program storing unit configured to store a plurality of programs including first programs and second programs, the first programs being a plurality of programs expected to be booted in a first sequence, and the second programs being a plurality of programs expected to be booted in a second sequence;

a first managing unit configured to manage first accumulated information, the first accumulated information indicating one or more programs which have been booted among the first programs;

a second managing unit configured to manage second accumulated information, the second accumulated information indicating one or more programs which have been booted among the second programs, the second managing unit being distinct from the first managing unit;

a certificate storing unit configured to store first certificate and second certificate, the first certificate including first expected accumulated information and first setting information, the second certificate including second expected accumulated information and second setting information, the first expected accumulated information indicating that all of the first programs have been booted in the first sequence, the second expected accumulated information indicating that none of the second programs have been booted, the first setting information being expected to be identical to the second setting information, the second setting information being a value to be accumulated into the second accumulated information; and, the integrity device, when last program in the first sequence has booted and before initial program in the second sequence is booted:

(i) controlling the first managing unit to verify that all of the first programs have been booted in the first sequence when the first accumulated information matches the first expected accumulated information;

(ii) controlling the second managing unit to verify that none of the second programs have been booted when the second accumulated information matches the second expected accumulated information;

(iii) verifying that the first setting information matches the second setting information; and (iv) controlling the second managing unit to accumulate the second setting information into the second accumulated information in order to indicate that all of the first programs have been booted in the first sequence and none of the second programs have been booted, when it is verified that (a) all of the first programs have been booted in the first sequence, (b) none of the second programs have been booted, and (c) the first setting information matches the second setting information.

* * * * *